United States Patent
Strauss

(10) Patent No.: US 10,732,060 B2
(45) Date of Patent: Aug. 4, 2020

(54) FORCE/TORQUE SENSOR WITH HARDSTOPS TO LIMIT OVERLOADING A FLEXURE

(71) Applicant: X Development LLC, Mountain View, CA (US)

(72) Inventor: Marc Strauss, Fremont, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 16/103,931

(22) Filed: Aug. 15, 2018

(65) Prior Publication Data
US 2020/0056950 A1 Feb. 20, 2020

(51) Int. Cl.
 G01L 1/26 (2006.01)
 B25J 9/16 (2006.01)
 G01L 5/00 (2006.01)
 G01L 1/24 (2006.01)

(52) U.S. Cl.
 CPC ............ G01L 1/26 (2013.01); B25J 9/1694 (2013.01); G01L 1/24 (2013.01); G01L 5/009 (2013.01)

(58) Field of Classification Search
CPC combination set(s) only.
See application file for complete search history.

(56) References Cited

U.S. PATENT DOCUMENTS

| 3,970,982 A * | 7/1976 | Kurtz .................... G01L 1/2206 73/862.382 |
| 4,099,409 A | 7/1978 | Edmond |
| 4,704,909 A | 11/1987 | Grahn et al. |
| 4,771,999 A * | 9/1988 | Takeuchi .................. B25B 1/04 269/135 |
| 4,823,618 A | 4/1989 | Ramming |
| 5,513,536 A * | 5/1996 | Reger .................... B25J 13/085 73/814 |
| 5,591,924 A * | 1/1997 | Hilton ..................... G01L 1/248 73/862.043 |

(Continued)

FOREIGN PATENT DOCUMENTS

| EP | 1843243 | 10/2007 |
| EP | 2195628 | 6/2010 |
| WO | 2018065765 | 4/2018 |

OTHER PUBLICATIONS

Capacitive F/T Transducer Model 200, Low-Cost Six Axis Force/Torque Sensor Data Sheet, ATI Industrial Automation, http://www.ati-ia.com/Library/documents/Capacitive%20FT200.pdf.

(Continued)

*Primary Examiner* — Tran M. Tran
(74) *Attorney, Agent, or Firm* — McDonnell Boehnen Hulbert & Berghoff LLP

(57) ABSTRACT

An example device includes a rigid plate, an inner element, a plurality of connecting flexural elements coupled between the inner element and rigid plate, and a hardstop that extends through the inner element and couples to the rigid plate. The inner element has a plurality of reflective surface areas that are configured to reflect light to a sensor. The plurality of connecting flexural elements allow the inner element to move relative to rigid plate. The hardstop contacts the inner element when a load applied on the device exceeds a threshold load.

20 Claims, 9 Drawing Sheets

(56) References Cited

U.S. PATENT DOCUMENTS

| | | | | |
|---|---|---|---|---|
| 5,648,617 | A * | 7/1997 | Cullen | G01L 1/2231 |
| | | | | 73/862.042 |
| 5,706,027 | A * | 1/1998 | Hilton | B25J 13/02 |
| | | | | 345/156 |
| 5,798,748 | A * | 8/1998 | Hilton | G01D 18/008 |
| | | | | 345/156 |
| 6,253,626 | B1 | 7/2001 | Shoberg et al. | |
| 6,257,957 | B1 | 7/2001 | Murray et al. | |
| 6,269,702 | B1 | 8/2001 | Lambson | |
| 6,550,346 | B2 * | 4/2003 | Gombert | G01L 5/166 |
| | | | | 250/208.6 |
| 6,590,222 | B1 * | 7/2003 | Bisset | G01S 3/781 |
| | | | | 15/53.3 |
| 6,697,044 | B2 | 2/2004 | Shahoian et al. | |
| 6,753,519 | B2 * | 6/2004 | Gombert | G01L 5/166 |
| | | | | 250/221 |
| 6,804,012 | B2 * | 10/2004 | Gombert | G01D 5/34 |
| | | | | 250/208.6 |
| 6,822,635 | B2 | 11/2004 | Shahoian et al. | |
| 6,871,552 | B2 | 3/2005 | Liu et al. | |
| 6,928,886 | B2 * | 8/2005 | Meusel | G01B 11/002 |
| | | | | 73/862.324 |
| 7,026,599 | B2 * | 4/2006 | Gombert | G01L 5/166 |
| | | | | 250/221 |
| 7,047,826 | B2 * | 5/2006 | Peshkin | G01L 1/14 |
| | | | | 73/862.53 |
| 7,057,154 | B2 * | 6/2006 | Kitamura | G01L 5/166 |
| | | | | 250/221 |
| 7,121,147 | B2 | 10/2006 | Okada | |
| 7,122,818 | B2 * | 10/2006 | Kitamura | G01D 5/268 |
| | | | | 250/559.32 |
| 7,190,440 | B2 * | 3/2007 | Ng | G01L 1/247 |
| | | | | 73/762 |
| 7,220,958 | B2 * | 5/2007 | Kitamura | G01L 5/166 |
| | | | | 250/221 |
| 7,289,228 | B2 * | 10/2007 | Kitamura | G01B 11/16 |
| | | | | 250/208.6 |
| 7,360,456 | B2 | 4/2008 | Morimoto | |
| 7,474,296 | B2 * | 1/2009 | Obermeyer | G05G 9/047 |
| | | | | 345/156 |
| 7,491,957 | B2 * | 2/2009 | Kitamura | G01L 5/166 |
| | | | | 250/227.11 |
| 7,701,202 | B2 | 4/2010 | Torres-Jara | |
| 7,706,916 | B2 * | 4/2010 | Hilton | G01L 5/223 |
| | | | | 345/156 |
| 8,063,883 | B2 * | 11/2011 | Senft | G01D 5/34 |
| | | | | 250/239 |
| 8,094,121 | B2 * | 1/2012 | Obermeyer | G05G 9/047 |
| | | | | 345/156 |
| 8,101,904 | B2 | 1/2012 | Torres-Jara | |
| 8,161,827 | B2 | 4/2012 | Kato et al. | |
| 8,243,024 | B2 * | 8/2012 | Senft | G01D 5/34 |
| | | | | 250/239 |
| 8,462,358 | B2 * | 6/2013 | Becker | G01L 5/166 |
| | | | | 250/208.6 |
| 8,726,741 | B2 | 5/2014 | Krippner et al. | |
| 8,749,522 | B2 * | 6/2014 | Dietzel | G01L 1/247 |
| | | | | 345/175 |
| 8,776,616 | B2 | 7/2014 | Szasz et al. | |
| 8,816,962 | B2 * | 8/2014 | Obermeyer | G05G 9/047 |
| | | | | 345/156 |
| 8,943,902 | B2 | 2/2015 | Bosscher et al. | |
| 8,965,577 | B2 | 2/2015 | Arimitsu | |
| 9,038,484 | B2 | 5/2015 | Seibold | |
| 9,127,996 | B2 * | 9/2015 | Kawai | G01L 5/167 |
| 9,217,680 | B2 * | 12/2015 | Kamiya | B25J 9/00 |
| 9,239,639 | B1 | 1/2016 | Vanderet et al. | |
| 9,274,014 | B2 * | 3/2016 | Janik | G01L 5/16 |
| 9,366,587 | B2 * | 6/2016 | Nagura | G01B 9/02028 |
| 9,671,298 | B2 * | 6/2017 | Sawada | B25J 9/1697 |
| 9,751,220 | B2 * | 9/2017 | Murphy | G01L 3/04 |
| 9,989,427 | B2 * | 6/2018 | Teshigawara | G01L 1/2206 |
| 10,048,145 | B2 * | 8/2018 | Janik | G01L 5/16 |
| 10,527,509 | B2 * | 1/2020 | Mokhbery | G01L 5/162 |
| 10,545,063 | B2 * | 1/2020 | Kamiya | H01L 41/18 |
| 2004/0129899 | A1 | 7/2004 | Gombert | |
| 2005/0185196 | A1 | 8/2005 | Kitamura | |
| 2013/0265233 | A1 | 10/2013 | Obermeyer et al. | |
| 2014/0045600 | A1 | 2/2014 | Zhu et al. | |
| 2014/0197936 | A1 | 7/2014 | Biggs et al. | |
| 2014/0238153 | A1 | 8/2014 | Wood et al. | |
| 2015/0177082 | A1 | 6/2015 | Sawada et al. | |
| 2016/0252410 | A1 | 9/2016 | Teshigawara | |
| 2017/0211999 | A1 | 7/2017 | Bradford et al. | |
| 2017/0363464 | A1 | 12/2017 | Shafer | |
| 2018/0120181 | A1 | 5/2018 | Kamiya | |
| 2020/0049579 | A1 * | 2/2020 | Noh | G01L 1/048 |

OTHER PUBLICATIONS

HEX-58-RE-400N 6-Axis Force Sensor Data Sheet, OptoForce, http://optoforce.com/wp-content/uploads/2014/03/HEX-58-RE-400N-Datasheet-1.41.pdf.

HEX-70-CE-2000N 6-Axis F/T Sensor Data Sheet, OptoForce, http://optoforce.com/wp-content/uploads/2014/03/HEX-70-CE-2000N-Datasheet-1.41.pdf.

HEX-70-CG-1000N 6-Axis F/T Sensor Data Sheet, OptoForce, http://optoforce.com/wp-content/uploads/2014/03/HEX-70-CG-1000N-Datasheet-1.41.pdf.

HEX-70-CH-4000N 6-Axis F/T Sensor Data Sheet, OptoForce, http://optoforce.com/wp-content/uploads/2016/09/HEX-70-CH-4000N-Datasheet-1.5.pdf.

HEX-70-XE 6-Axis F/T Sensor Data Sheet, OptoForce, http://optoforce.com/wp-content/uploads/2014/03/HEX-70-XE-Datasheet.pdf.

HEX-70-XG 6-Axis F/T Sensor Data Sheet, OptoForce, http://pdf.directindustry.com/pdf/optoforce-ltd/hex-7-0-x-g/125451-667819.html.

FT 150 Force Torque Sensor, RobotIQ, http://robotiq.com/wp-content/uploads/2014/09/Robotiq-Force-Torque-Sensor-FT-150-Specifications.pdf.

6-Axis Force / Moment Sensor FT, Schunk, https://us.schunk.com/fileadmin/pim/docs/IM0018179.PDF.

FT 300 Force Torque Sensor, RobotIQ, http://robotiq.com/wp-content/uploads/2016/01/specsheet-FT300-Final-web.pdf.

Caroline Jacq, Barthelemy Luthi, Thomas Maeder, Olivier Lambercy, Roger Gassert, Peter Ryser, Thick-film multi-DOF Force / torque sensor for wrist rehabilitation, Aug. 2010, Sensors and Actuators A, vol. 162, No. 2, p. 361-366, published by Elsevier.

A soft touch: Compliant Tactile Sensors for Sensitive Manipulation. E. Torres-Jara, I. Vasilescu, and R. Coral. Computer Science and Artificial Intelligence Laboratory Technical Report MIT-CSAIL-TR-2006-14. Mar. 2006.

"Development of a Low Cost 3D Optical Compliant Tactile Force Sensor." A Tar, G. Cserey. IEEE/ASME AIM2011. 2011.

Written Opinion and International Search Report of related international application No. PCT/US2019044452, dated Nov. 6, 2019, 17 pages.

* cited by examiner

1200

1202
Receiving a load on a rigid plate coupled to a flexure

1204
Deforming at least one of a plurality of connecting flexural elements of the flexure when the load is received

1206
A portion of the flexure contacting a hardstop when the load received exceeds threshold load, wherin the hardstop extends through the flexure and is coupled to the rigid plate, and

1208
The hardstop limiting further deformation of the at least one of the plurality of connecting flexural elements when the portion of flexure contacts the hardstop.

FIG. 12

FORCE/TORQUE SENSOR WITH HARDSTOPS TO LIMIT OVERLOADING A FLEXURE

BACKGROUND

Robotic systems may be used for applications involving material handling, welding, assembly, and dispensing, among others. Over time, the manner in which these robotic systems operate is becoming more intelligent, more efficient, and more intuitive. As robotic systems become increasingly prevalent in numerous aspects of modern life, the need for robotic systems that can operate alongside and interface with humans becomes apparent. Therefore, a demand for such robotic systems has helped open a field of innovation in actuators, sensing techniques, controllers, as well as component design and assembly.

SUMMARY

The present application discloses implementations that relate to devices, systems and methods that may include a force/torque sensor as part of a force/torque sensing system or device. The force/torque sensing system may be included as part of a robotic system, such as a robotic arm. Force/torque sensors described herein may include an inner element, a rigid plate, a plurality of connecting flexural elements, and a hardstop. The inner element and the connecting flexural elements may be components of a unibody flexure component or "flexure." Within examples, when a load applied on the force/torque sensor exceeds a threshold load, the hardstop may provide overload protection to the flexure by creating a stiffer, stronger parallel load path and limiting further deformation of the flexure.

In some implementations, the rigid plate may be connected to one component of a robotic arm (or other system) and the inner element of the flexure may be connected to another component of the robotic arm. Connecting flexural elements coupled between the inner element and the rigid plate may provide a known resistance to the movement of the inner element relative to the rigid plate such that deflections between the inner element and rigid plate caused by an external load on the device or system may be determined. Within examples, the force/torque sensing system may determine at least one component of the forces and torques (or moments) of a load applied on the robotic arm based on the measured deflection.

In at least one embodiment, a device is described. The device includes a rigid plate, an inner element, a plurality of connecting flexural elements, and a hardstop. The inner element includes a plurality of reflective surface areas that are configured to reflect light to a sensor. The plurality of connecting flexural elements are coupled between the inner element and the rigid plate. Moreover, the connecting flexural elements are configured to allow the inner element to move relative to the rigid plate. The hardstop extends through an opening of the inner element and is connected to the rigid plate. Further, the hardstop contacts the inner element when a load applied on the device exceeds a threshold load. Within examples, the inner element and connecting flexural elements are considered a single unibody flexure.

In another embodiment, a method is described. In some examples, the method may be carried out by various implementations of the device described herein. The method includes receiving a load on a rigid plate. The rigid plate is coupled to a flexure. The method further includes deforming at least one of a plurality of connecting flexural elements of the flexure. A hardstop extends through the flexure and is connected to the rigid plate. In some examples, the hardstop may extend through an inner element of the flexure. Continuing, the method includes a portion of the flexure contacting the hardstop when load received exceeds a threshold load. The method also includes the hardstop limiting further deformation of the at least one connecting flexural element when the portion of the flexure contacts the hardstop.

In yet another embodiment, a robotic system is described. The system includes a rigid plate, a flexure, a control system, and a hardstop. The flexure includes an inner element and a plurality of connecting flexural elements. A plurality of reflective surface areas that are configured to reflect light to a sensor are coupled to the inner element. The connecting flexural elements are connected between the inner element and the rigid plate. Additionally, the connecting flexural elements are configured to allow the inner element to move relative to the rigid plate. The control system is configured to receive reflected light data from the sensor. Based on the reflected light data, the control system is further configured to determine a deflection of the inner element relative to the rigid plate when a load is applied on at least one of the inner element or the rigid plate. Additionally, the control system is configured to determine one or more output parameters of the applied load on the system based on the determined deflection. The hardstop of the system extends through an opening of the inner element of the flexure. Also, the hardstop is connected to the rigid plate and the hardstop contacts the inner element when a load applied on the robotic system exceeds a threshold load.

In yet another aspect, another system is described. The system includes means for receiving a load on a rigid plate. The rigid plate is coupled to a flexure. The system also includes means for deforming at least one of a plurality of connecting flexural elements of the flexure. A hardstop extends through the flexure and is connected to the rigid plate. Continuing, the system further includes means for contacting the hardstop by a portion of the flexure when load received exceeds a threshold load. The system also includes means for limiting further deformation of the at least one connecting flexural element when the portion of the flexure contacts the hardstop.

These as well as other aspects, advantages, and alternatives will become apparent to those of ordinary skill in the art by reading the following detailed description, with reference where appropriate to the accompanying drawings.

BRIEF DESCRIPTION OF THE DRAWINGS

FIG. 12 is a block diagram of an example method, according to an example embodiment.

DETAILED DESCRIPTION

Figure 1:
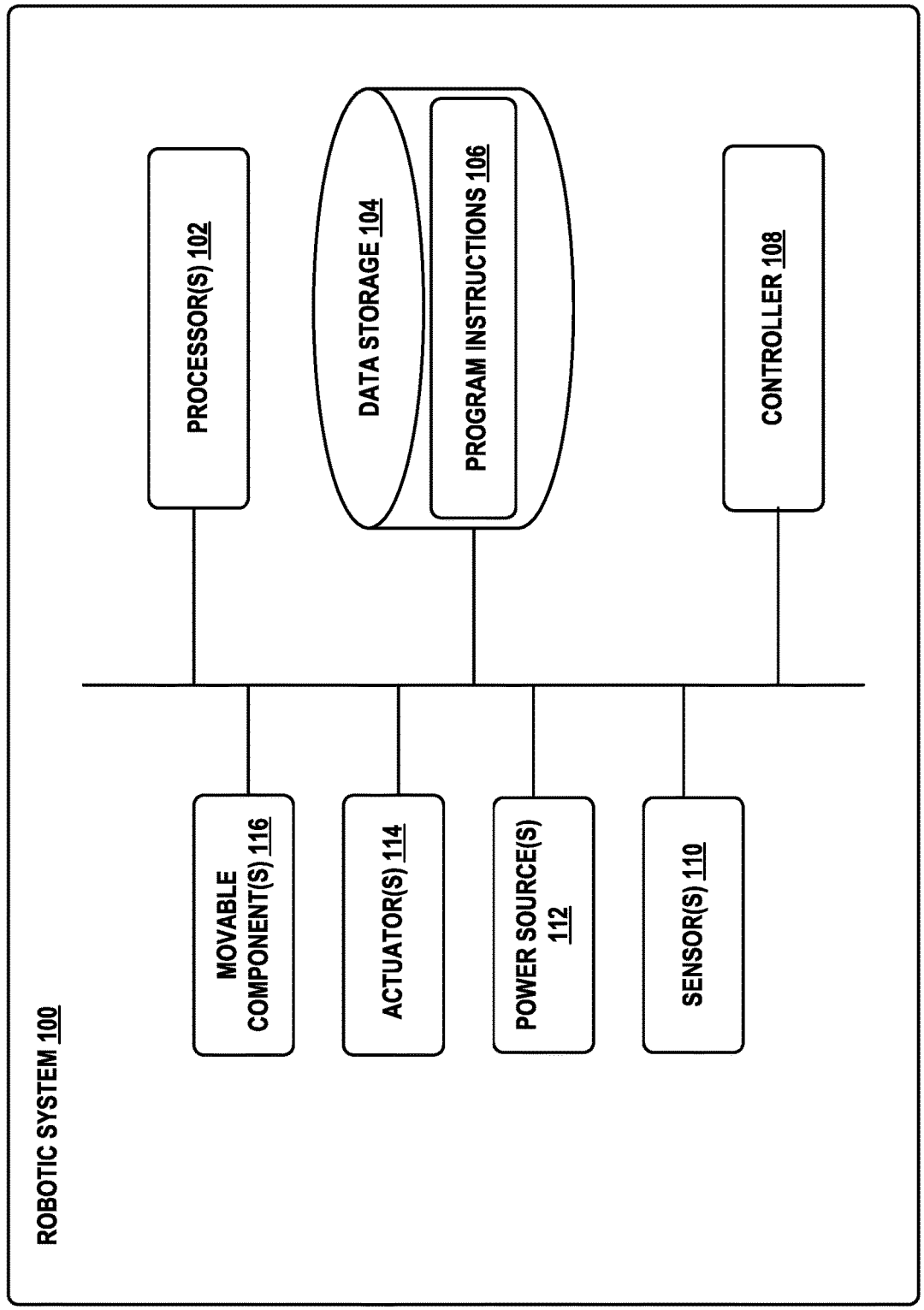
FIG. 1 illustrates an example configuration of a robotic system, according to an example embodiment.

Example devices, systems, and methods are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. Overview

Robotics are increasingly being applied to more widespread applications, finding uses in industrial, hospital, home and commercial environments. Force/torque sensing capabilities are a useful resource for enabling implementation of various behaviors which require haptic feedback, and also for providing a safe and compelling user-experience when interfacing with people. An enabling trend in the growing ubiquity of robots is the gradual introduction of lower-cost and more human-safe technologies. Furthermore, force/torque sensing capabilities enable other behaviors including opening and closing doors and/or drawers, or wiping surfaces, etc. Despite this, force/torque sensors commercially available remain quite costly, and consequently are not feasible for integration in very-low cost systems.

Specifically, availability of a six-axis (or six degrees-of-freedom) force/torque sensing device (or "FT sensor") at lower prices relative to existing technologies may enable a wide range of applications which do not justify the costs of current force/torque sensing options. In addition to strain gage based sensors (which may be quite costly), there has been a recent emergence of displacement-based sensors using various technologies such as optical and capacitive approaches. The currently available versions of these displacement-based sensors tend to be too large in size for use in small robotic systems, and remain cost-prohibitive for certain applications. Other displacement-based sensors may include various custom machined parts that take significant time and money to manufacture, especially at scale, and may also be difficult and timely to install. Thus, as the use of robotic systems continues to grow, the resultant need for scalable, low-cost sensing systems that fits within a small footprint poses a unique engineering challenge.

Some displacement-based FT sensors may rely upon the use of a flexure to provide a repeatable relationship between applied load and resultant deflection. Flexures may be injection molded, 3D printed, or otherwise constructed into a single component (or "unibody flexure"). In other examples, various components may be molded, 3D printed, or otherwise constructed and then combined or otherwise connected to create the flexure. Among other examples, unibody flexures may be constructed from plastic in order to be rapidly manufactured at relatively low costs and in high volume when compared to other known manufacturing methods. A unibody flexure may include less parts and components than other designs, which may also result in cost savings. In addition, plastic flexures also offer low mass sensor solutions and thus employing flexure-based FT sensors has a reduced impact on the dynamics of a robotic system utilizing this type of FT sensor.

However, relatively lower-cost, easily mass-manufactured plastic flexures are susceptible to their own design limitations. Particularly, protecting the FT sensor during overload conditions in which the FT sensor experiences loads that exceed design or threshold loads. For example, when forces and/or torques above the yield strength of the flexure are applied, or the flexure experiences certain repeated exposure to loading conditions, the flexure may permanently deform. Permanent deformations can affect the elasticity in a manner that the repeatable relationships relied upon when utilizing flexure/displacement-base sensing are no longer accurate. Thus, the responses of the internal sensing means to forces may change, and the accuracy, precision, and reliability of the FT sensor may be compromised.

As such, flexure-based sensing techniques that are dependent on the elastic characteristics of the flexure offer unique design challenges. For example, making the flexure thicker in order to withstand higher load scenarios may render the sensor less effective with lower forces and smaller displacements. In other words, the flexure must be thin enough to allow relative displacement substantial enough to be detected by optical sensing means, for example. However, thinner flexures may be more susceptible to becoming damaged by forces or loading scenarios experienced by a robotic system. For example, the flexure still must be stiff enough to keep material stress low under torque loads. While some designs may employ various elaborate mechanical systems (e.g., caging, complex housing apparatuses, etc.) to protect a FT sensor from high forces, such designs increase the complexity of the sensor, increase the number of parts required, and may be difficult to implement, especially in high-volume applications.

Beneficially, the implementations described herein, consistent with the intention of low-cost, easily mass-production displacement-based FT sensors, include a hardstop that can be utilized with a flexure or components thereof in order to provide overload protection for displacement-based FT sensors. As described herein, the hardstop provides at least one point of contact such that when overloads are applied to the FT sensor, the hardstop and the flexure come into direct, mechanical contact, thereby creating a stiffer and stronger parallel load path. As such, rather than causing permanent deformation or other damage to the flexure, the integrity of the flexure and the FT sensor is maintained. A FT sensor with overload protection may require less maintenance, operate for a longer period of time, and experience fewer mechanical issues than similar flexure-based sensors without overload protection.

The design of a FT sensor including a hardstop to protect and maintain the integrity of a flexure during overload conditions, as well as associated, connecting components, may provide cost and space efficiency for utilization in a robotic device or system. In further examples, the design may be used by robot accessory manufacturers for applications of low-cost robotic systems in unstructured or changing environments. The design may also be employed in other types of systems, such as input devices for gaming, or in medical applications for measuring forces applied by a patient during recovery of motor skills and muscular strength following a stroke or other incident.

II. Example Displacement Based Sensing Techniques

Resultant deflections may indicate one or more components of position and/or orientation of components of a flexure within a FT Sensor. Further, the resultant deflection, or just deflection, may include linear and/or rotational displacement of components of the flexure assembly within a displacement-based sensor. Within examples, the deflection may be considered a relative position between components of the flexure assembly. As FT sensors and flexures are made smaller, the resultant deflection tends to decrease (maintaining a comparable degree of deflection would necessitate design changes which result in higher stresses). For optimal performance of a sensor, it may be desirable that the magnitude of deflections of the sensing elements is roughly equal for each full-scale component load. Furthermore, the deflection provided by the sensor may need to be sufficient to provide the desired measurement resolution as dictated by the sensing technology and application.

An example unibody flexure within a flexure assembly may be used as part of a six-axis force/torque sensor (e.g., for a commercial robotic mobile manipulator). A flexure assembly may include an injection molded, unibody flexure that includes or connects to components that are configured to move relative to one another in six degrees-of-freedom. For example, as described in more detail below, the flexure may include an inner element and a plurality of connecting flexural elements. The flexural elements may connect the inner element to a rigid plate. In some examples, the inner element may be a disk-like element and may take various shapes such as round, circular, rectangular, or hexagonal, among other possibilities.

The connecting flexural elements may flex, bend, twist, or otherwise allow the inner element to move relative to the rigid plate such that any resulting deflection between the inner element and the rigid plate may be determined by a sensor, such as a displacement sensor. Moreover, the connecting flexural elements may act like springs or spring components in providing a linear, polynomial, or other resistance relationship. Within examples, the connecting flexural elements may be designed to resist a load applied on the flexure assembly beyond a resting zero-load position. When at rest, the flexure assembly may be considered to be in a neutral position or zero-load position. In some aspects, the plurality of connecting flexural elements may permit deflection between the inner element and the rigid plate when a load is applied to the flexure assembly of the FT sensor.

In some examples, the sensor may be an optical sensor that includes emitters and detectors that are configured to measure changes in reflected light such that determinations about displacement can be measured. The inner element may include a plurality of reflective surfaces that are configured to reflect light back to a sensing element. The sensing element may be coupled to the rigid plate such that the sensing element is configured to move with the rigid plate relative to the reflective surfaces of the inner element. As such, when a force is applied to at least one of the rigid plate or the inner element, characteristics of light reflected from the reflective surfaces back to the sensing element may change.

In some examples described below, the sensing element includes a printed circuit board that includes emitter(s) and detectors. The sensor, sensing element, or a sensing system included as part of a computing or control system may then determine a magnitude of deflection based on the change in the reflected light. In other implementations, other known sensing techniques may be used instead. For example, instead of reflective surfaces the inner element (as well as other components) may include capacitive features that may also provide data about the deflection of flexure device components described herein.

The flexure may be injection molded, 3D printed, or otherwise constructed into a single component. By utilizing such manufacturing methods, the flexure device may include only a single unique part that can be rapidly manufactured at relatively low costs and in high volume when compared to other known manufacturing methods. Furthermore, with a unibody flexure, a flexure assembly described herein may include fewer parts and components than previously existing designs. In other examples, various components may be molded, 3D printed, or otherwise constructed and then combined or otherwise connected to create the flexure device.

The connecting flexural elements may have a different desirable stiffness depending on the designed use of the force/torque sensor that may include a designed range of load magnitudes the sensor may experience or be configured to measure. The stiffness of the flexural elements may be based on the design (e.g., shape and dimensions) along with the modulus of elasticity of the material chosen for the flexural element. For example, a high modulus of elasticity may be sought when deflection is undesirable, while a low modulus of elasticity is required when flexibility is needed. The shape and dimensions of the connecting flexural elements also affect the overall stiffness of the unibody flexure device. Knowing the stiffness of the flexural elements as well as measuring the deflection of the inner element relative to the rigid plate may allow a system to calculate the resultant forces experienced by the overall flexure assembly when a load is applied to the system. Within implementations, a fixed amount of displacement may be preferred and as such a design load resulting in such a displacement may be considered. Nonetheless, if there is a high load application, for example, the overall flexure stiffness may be made greater to prevent too much motion, and the opposite (e.g., with a low load application, lower stiffness to prevent too little motion) may similarly be considered.

A stiffness matrix, which includes stiffness entries or elements for six degrees-of-freedom, may define or model the overall stiffness of the flexural elements and/or the unibody flexure device. As such, a flexure device design that includes multiple flexural elements with a uniquely designed shape may allow for tuning or control of the stiffness matrix in six degrees-of-freedom. For example, the design may provide the ability to effectively adjust each element of the stiffness matrix, where the elements may include a stiffness along an x-axis, a stiffness along a y-axis, a stiffness along a z-axis, a stiffness in bending (or rotation) about the x-axis, a stiffness in bending about the y-axis and a stiffness in bending about the z-axis. In one embodiment, tuning the stiffness matrix may include reducing an amount of deflection due to torques (or moments) about the x-axis and/or the y-axis, while maintaining deflections from axial forces along the z-axis. As such, among other possible examples, the connecting flexural elements may have an arch shape with a curved portion and possible straight portion(s). The connecting flexural elements may also have a certain calculated thickness. By specifically designing the radius of the curve of the arch, an overall height of the flexural elements (a combination of the curve and the straight portions), and/or the width (or thickness) of the connecting flexural elements, the flexure design may allow for precise tuning of the stiffness matrix of the flexure in six degrees-of-freedom. Tuning of the stiffness matrix may allow for additional control over the magnitude of deflections and movement between the elements of the flexure device as well as components of the overall flexure assembly.

An axial force applied on the rigid plate may cause linear deflections or displacements of the inner element relative to the rigid plate; similarly, a torque applied on the rigid plate may cause rotation or angular displacement of the inner element relative to the rigid plate. Within examples, an axial force may cause combined linear motion and rotation of the inner element relative to the rigid plate. In some embodiments, deflections may be measured at fixed points of the inner element, or components coupled to the inner element, relative to points on the rigid plate, or components coupled to the rigid plate. The points of measurement are not coincident with the center of rotation and that are located a distance away from the center of rotation, such that an induced rotation of the elements relative to one another may result in apparent translation to a sensing element. Thus, the deflection from forces and torques may be measured in meters, for example.

Within examples, a six degree-of-freedom force/torque displacement sensor (FT sensor) may have design loads and desired deflections based upon the designed applications or environments for the sensor. For example, within an environment, the FT sensor may be designed for six degrees-of-freedom, where $F_x$, $F_y$, and $F_z$ represent the component forces in three directions and $T_x$, $T_y$, and $T_z$ represent the components of the torques (or moments) about each axis. The torque may also be considered a moment as described herein. In some respects, the moment may apply to any vector quantity, and the torque is the moment of a force applied. While described in terms of torques below, it should be understood that moments are considered as well. Within examples, for instance, the design loads for each of the force and torque components may be $F_x=F_y=F_z=100$ newtons ("N"), $T_x=T_y=4$ newton-meters ("Nm"), and $T_z=2.5$ Nm. The desired deflections (represented by $d_x$, $d_y$, $d_z$ in each of the three directions) resulting from an applied load may include ranges of deflections. For example, the desired deflections may be 0.03 mm<$d_x$, $d_y$, $d_z$<0.15 mm.

Considering the design loads and range of desired displacements, a design stiffness of the flexural elements may be approximated and a geometry or shape of the flexural elements may then be designed. The design of the flexural elements may be tested and possibly optimized using a range of finite element analysis techniques. For example, with a reasonable linear approximation of the actual behavior of the flexure elements, the design stiffness ("k") may be calculated from the equation:

$$k = \frac{F}{d} \text{ or } k = \frac{T}{d \cdot a}$$

where "F" describes the force(s), "d" describes the displacement(s), "T" describes the torque(s) and "a" describes a torque arm (i.e. distance away from an axis upon which the force is acting). "F," "d," "T" "a" and "k" may also be represented in matrix form and include components in each direction.

While a six degrees-of-freedom ("DOF") force/torque displacement sensor system is specifically described herein, the devices and methods described herein are also considered for less than six DOF sensing systems as well. Devices, methods, and systems described herein for such six DOF sensors may be modified for applications where six DOF is not necessary. For example, flexures and devices described herein are also applicable to four DOF sensing systems, among other possibilities.

Within examples, when a load is applied to the FT sensor, one or more deflections of the inner element relative to the rigid plate (or components attached to either) may be measured by one or more sensors, and by approximating or determining the stiffness coefficient(s) of the flexural element(s), at least one component of the forces and/or torques may be determined using the relationships described above.

Within some examples, deflection may not need to be computed and instead, direct signals from the sensor may be mapped to force magnitudes. For example, raw voltages, frequencies or other output signals or parameters from sensing elements may be measured after applying known loads to the FT sensor. A model or direct mapping may then be created using the known applied loads and the measured sensor outputs. Utilizing this calibration process to create a direct correlation of sensor output to known loads, unknown forces and/or torques may be determined directly from the sensor output signal(s). Within other examples, outputs from the sensor may be mapped directly to other output parameters such as position or orientation of a robotic system.

The output signals from the sensing elements of the FT sensor may be dependent on relative deflections (or displacements) of components thereof, and the deflections may depend on the loads applied to the flexure of the FT sensor. As such, for example, deflections ("d") may be a function of volts ("V," as an example output signal of the sensing elements): d=f(V). Deflection may have a linear, polynomial, or other relationship to volts within specific examples. Continuing, an applied load ("R") may be a function of deflection: R=g(d). Similarly, applied loads may have a linear, polynomial or other relationship to deflection within specific examples. Thus, rather than determining both f(V) and g(d), calibration data previously collected and modeled may be used to directly model the resulting load ("R"), R=h(V), where h(V)=g(f(V)).

III. Example Robotic Systems

Referring now to the figures, FIG. 1 shows an example configuration of a robotic system 100. The robotic system 100 may be a robotic arm, a different type of robotic manipulator, or it may have a number of different forms. Additionally, the robotic system 100 may also be referred to as a robotic device, robotic manipulator, or robot, among others.

The robotic system 100 is shown to include processor(s) 102, data storage 104, program instructions 106, controller 108, sensor(s) 110, power source(s) 112, actuator(s) 114, and movable component(s) 116. Note that the robotic system 100 is shown for illustration purposes only as robotic system 100 may include additional components and/or have one or more components removed without departing from the scope of the invention. Further, note that the various components of robotic system 100 may be connected in any manner.

Processor(s) 102 may be a general-purpose processor or a special purpose processor (e.g., digital signal processors, application specific integrated circuits, etc.). The processor(s) 102 can be configured to execute computer-readable program instructions 106 that are stored in the data storage 104 and are executable to provide the functionality of the robotic system 100 described herein. For instance, the program instructions 106 may be executable to provide functionality of controller 108, where the controller 108 may be configured to instruct an actuator 114 to cause movement of one or more movable component(s) 116.

The data storage 104 may include or take the form of one or more computer-readable storage media that can be read or accessed by processor(s) 102. The one or more computer-readable storage media can include volatile and/or non-volatile storage components, such as optical, magnetic, organic or other memory or disc storage, which can be integrated in whole or in part with processor(s) 102. In some embodiments, the data storage 104 can be implemented using a single physical device (e.g., one optical, magnetic, organic or other memory or disc storage unit), while in other embodiments, the data storage 104 can be implemented using two or more physical devices. Further, in addition to the computer-readable program instructions 106, the data storage 104 may include additional data such as diagnostic data, among other possibilities.

The robotic system 100 may include one or more sensor(s) 110 such as optical sensors, force sensors, proximity sensors, motion sensors, load sensors, position sensors, touch sensors, depth sensors, ultrasonic range sensors, and infrared sensors, among other possibilities. The sensor(s) 110 may provide sensor data to the processor(s) 102 to allow for appropriate interaction of the robotic system 100 with the environment. Additionally, the sensor data may be used in evaluation of various factors for providing feedback as further discussed below. Further, the robotic system 100 may also include one or more power source(s) 112 configured to supply power to various components of the robotic system 100. Any type of power source may be used such as, for example, a gasoline engine or a battery.

The robotic system 100 may also include one or more actuator(s) 114. An actuator is a mechanism that may be used to introduce mechanical motion. In particular, an actuator may be configured to convert stored energy into movement of one or more components. Various mechanisms may be used to power an actuator. For instance, actuators may be powered by chemicals, compressed air, or electricity, among other possibilities. In some cases, an actuator may be a rotary actuator that may be used in systems involving rotational forms of motion (e.g., a joint in the robotic system 100). In other cases, an actuator may be a linear actuator that may be used in systems involving straight line motion.

In either case, actuator(s) 114 may cause movement of various movable component(s) 116 of the robotic system 100. The moveable component(s) 116 may include appendages such as robotic arms, legs, and/or hands, among others. The moveable component(s) 116 may also include a movable base, wheels, and/or end effectors, among others.

In some implementations, a computing system (not shown) may be coupled to the robotic system 100 and may be configured to receive input from a user, such as via a graphical user interface. This computing system may be incorporated within the robotic system 100 or may be an external computing system that is capable of (wired or wireless) communication with the robotic system 100. As such, the robotic system 100 may receive information and instructions, such as based on user-input at the graphical user interface and/or based on user-input received via press of buttons (or tactile input) on the robotic system 100, among other possibilities.

Figure 2:
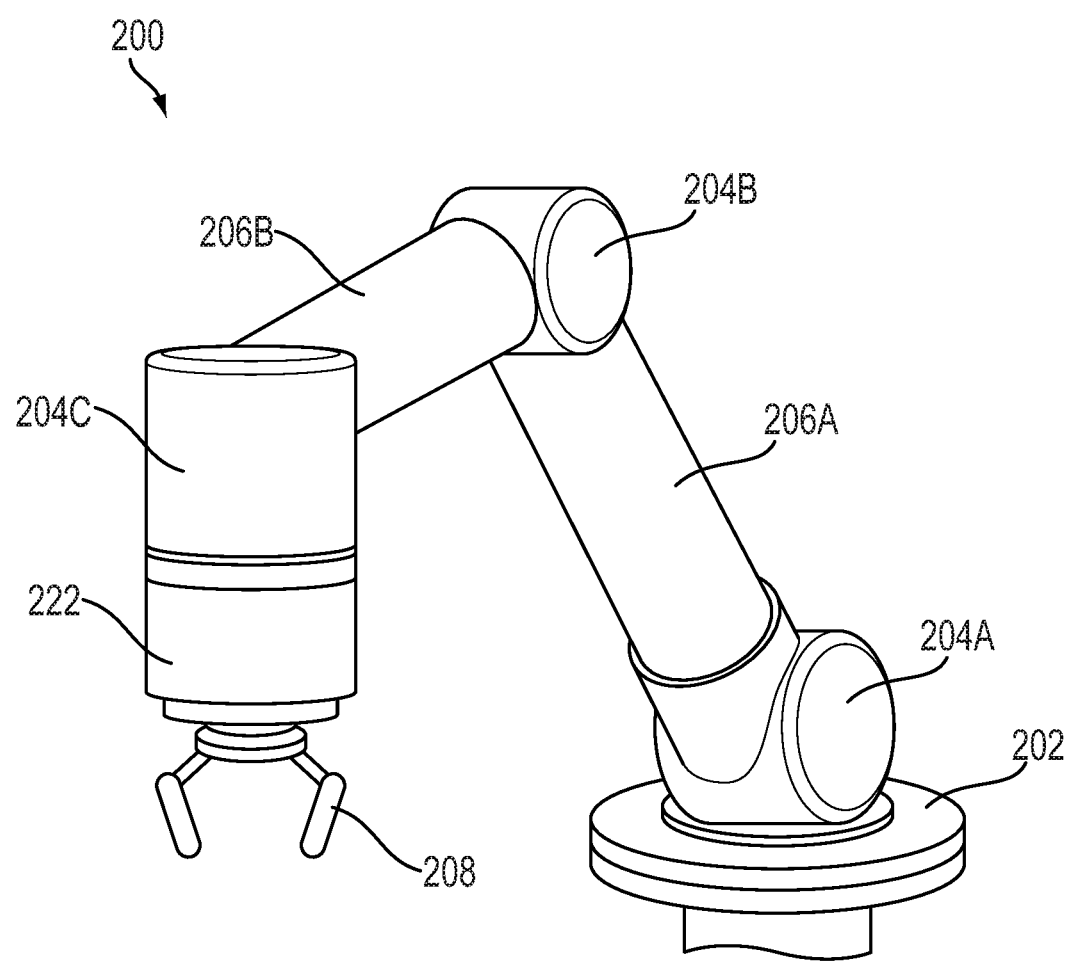
FIG. 2 illustrates an example robotic arm, according to an example embodiment.

A robotic system 100 may take on various forms. To illustrate, FIG. 2 shows an example robotic arm 200. As shown, the robotic arm 200 includes a base 202, which may be a stationary base or may be a movable base. In the case of a movable base, the base 202 may be considered as one of the movable component(s) 116 and may include wheels (not shown), powered by one or more of the actuator(s) 114, which allow for mobility of the entire robotic arm 200.

Additionally, the robotic arm 200 includes joints 204A-204C each coupled to one or more of the actuator(s) 114. The actuators in joints 204A-204C may operate to cause movement of various movable component(s) 116 such as appendages 206A-206B and/or end effector 208. For example, the actuator in joint 204B may cause movement of appendage 206B and the actuator in joint 204C may cause movement of the end effector 208. Further, end effector 208 may take on various forms and may include various parts. In one example, end effector 208 may take the form of a gripper such as a finger gripper as shown here or a different type of gripper such as a suction gripper. In another example, end effector 208 may take the form of a tool such as a drill or a brush. In yet another example, the end effector may include sensors such as force sensors, location sensors, and/or proximity sensors. Other examples may also be possible.

As illustrated in FIG. 2, the robotic arm 200 may also include a sensor housing 222. The sensor housing 222 is shown between joint 204C and the end effector 208, but may also be located between other components of robotic arm 200. The sensor housing 222 may include sensors, such as sensor(s) 110 from FIG. 1. The sensor housing 222 may also include mechanical and/or electrical components that are configured to receive inputs from other components of the robotic arm 200. In one example, the sensor housing 222 may include a unibody flexure that may be coupled to a rigid plate and/or other components. The sensor housing 222 may include a sensor assembly configured to measure a deflection caused when a load is applied on some component of the robotic arm 200, such as on the end effector 208. For example, an optical sensor may be coupled to a rigid plate of the sensor housing 222 while a plurality of reflective surfaces may be coupled to an inner element of the flexure. The inner element may be allowed to move relative to the rigid plate via one or more connecting flexural elements that are part of the flexure and connected between the inner element and the rigid plate. For example, the rigid plate may be coupled to the end effector 208 while the inner element is coupled to the joint 204C.

In some implementations, the sensor housing 222 may not include a defined cylindrical outer surface as shown in FIG. 2. For example, the unibody flexure and a sensor coupled to the flexure device may make-up the entirety of the sensor housing 222, among other possibilities.

In an example implementation, a robotic system 100, such as robotic arm 200, may be capable of operating in a teach mode. In particular, teach mode may be an operating mode of the robotic arm 200 that allows a user to physically interact with and guide the robotic arm 200 towards carrying out and recording various movements. In a teaching mode, an external force is applied (e.g., by the user) to the robotic system 100 based on a teaching input that is intended to teach the robotic system regarding how to carry out a specific task. The robotic arm 200 may thus obtain data regarding how to carry out the specific task based on instructions and guidance from the user. Such data may relate to a plurality of configurations of the movable component(s) 116, joint position data, velocity data, acceleration data, torque data, force data, and power data, among other possibilities.

For example, during teach mode the user may grasp onto any part of the robotic arm 200 and provide an external force by physically moving the robotic arm 200. In particular, the user may guide the robotic arm 200 towards grasping onto an object and then moving the object from a first location to a second location. As the user guides the robotic arm 200 during teach mode, the system may obtain and record data related to the movement such that the robotic arm 200 may be configured to independently carry out the task at a future time during independent operation (e.g., when the robotic arm 200 operates independently outside of teach mode). Note, however, that external forces may also be applied by other entities in the physical workspace such as by other objects, machines, and/or robotic systems, among other possibilities.

IV. Structure of an Example Force/Torque Sensing Device

Figure 3:
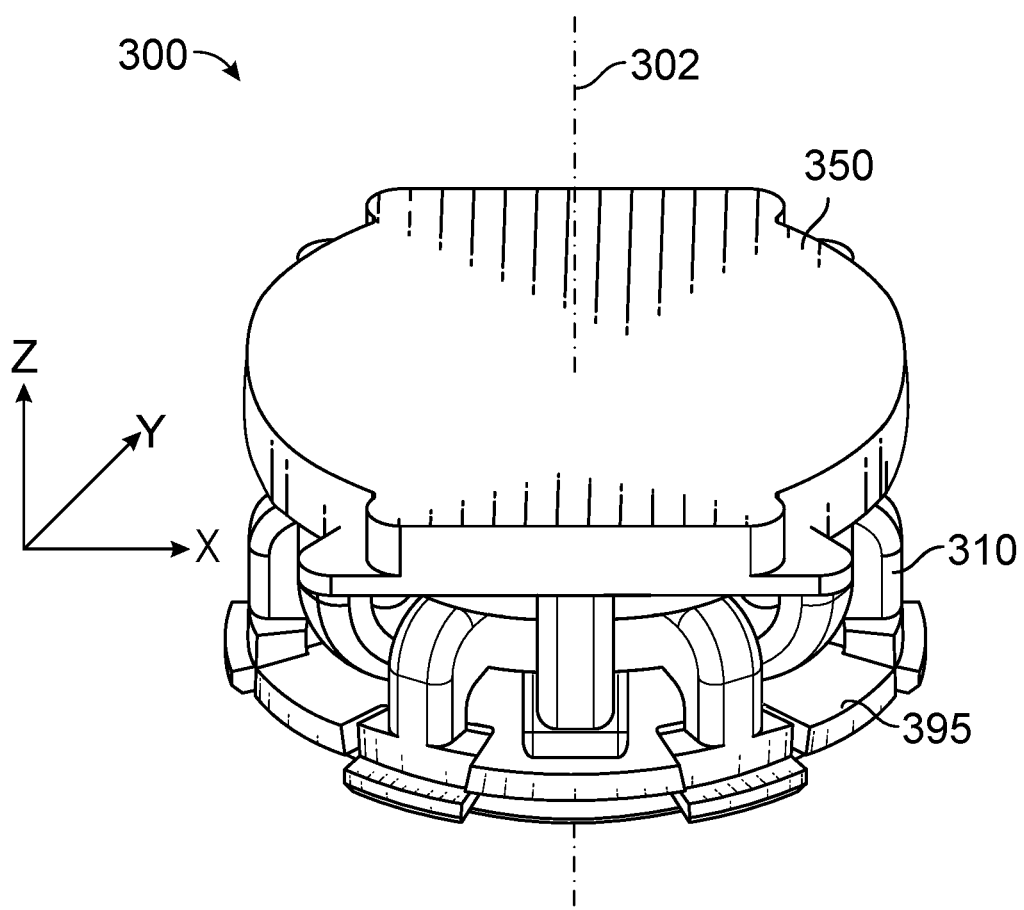
FIG. 3 illustrates a force/torque sensing device, according to an example embodiment.
Figure 4:
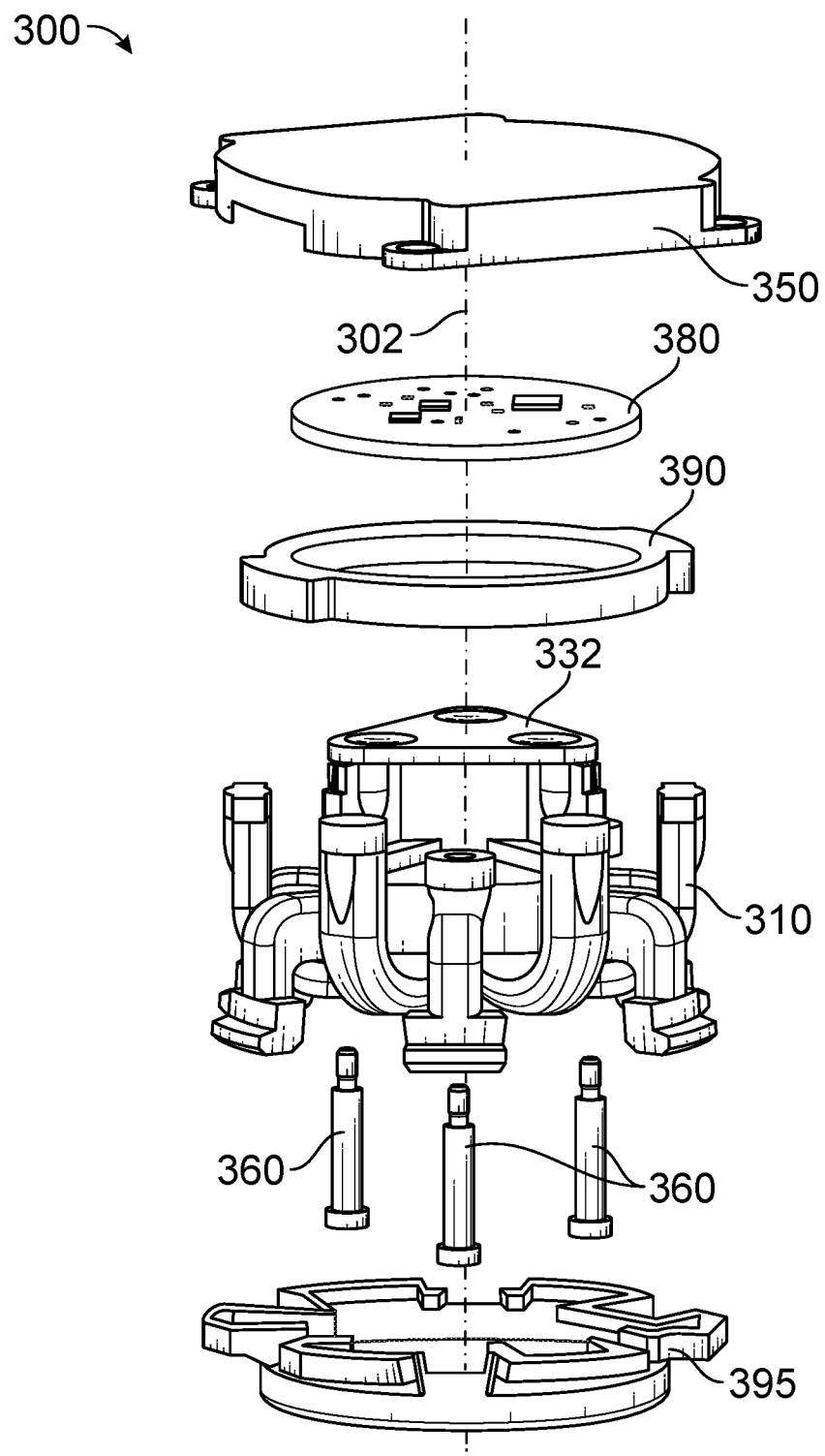
FIG. 4 illustrates separate components of a force/torque sensing device, according to an example embodiment.
Figure 5:
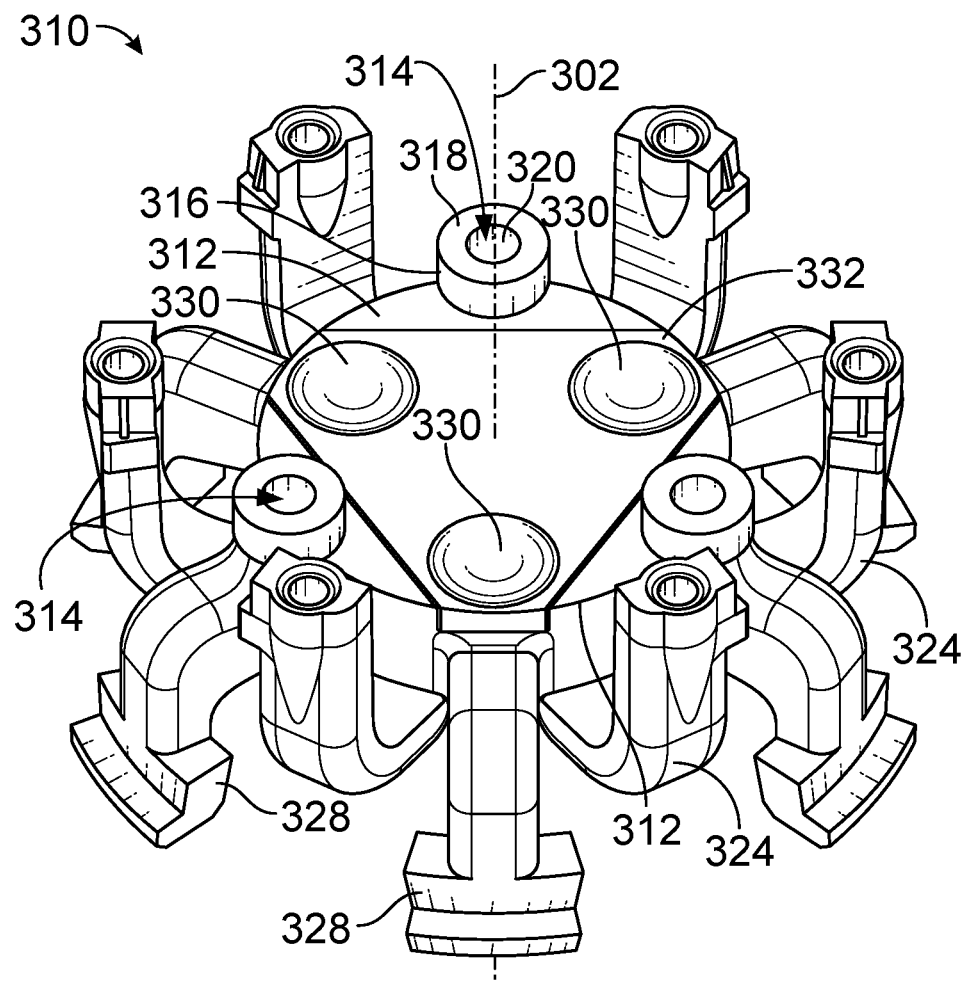
FIG. 5 illustrates a flexure for use with a force/torque sensing device, according to an example embodiment.
Figure 6:
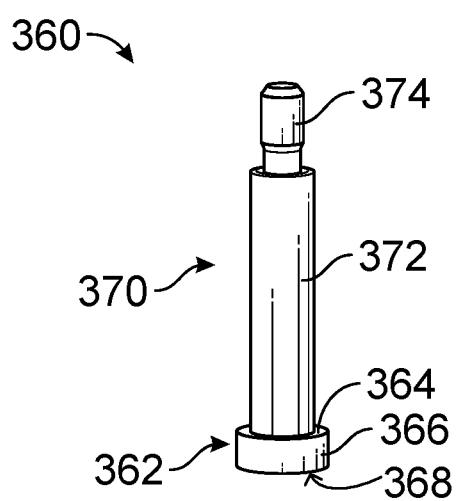
FIG. 6 illustrates a hardstop for use with a force/torque sensing device, according to an example embodiment.

FIG. 3 is a perspective view of a force/torque sensing device 300 ("FT sensor 300") that is assembled for exemplary uses as described throughout this description. FIG. 4 is an exploded view of various components of the FT sensor 300. FIG. 5 and FIG. 6 each provide a perspective view of specific components of the FT sensor 300. Although not every component is expressly labeled in each view, it should be understood from the Figures and description below that the FT sensor 300 of FIG. 3 is similar in form and function to the FT sensor 300 of FIG. 4 and components not expressly described in relation to one Figure may nonetheless be included in that Figure.

The FT sensor 300 includes a flexure 310, a reflector plate 332, a rigid plate 350, a plurality of hardstops 360, a sensing element 380, a gasket 390, and a second rigid plate 395. The FT sensor 300 may be a displacement-based sensor that may include other components not depicted and may also be connected to other components not depicted in FIG. 3 or FIG. 4. For example, the FT sensor 300 may be located within a sensor housing as part of a robotic system, such as sensor housing 222 and robotic arm 200 of FIG. 2. Within examples, the FT sensor 300 with flexure 310 may couple to components of a robotic system, such as a robotic arm, end effector, gripper or other possible components. For example, a component of a robotic arm (e.g., robotic arm 200 of FIG. 2) may be coupled to the rigid plate 350 and another component may be coupled to the second plate 395. As such, within such examples where the FT sensor 300 may be between an end effector and another component of a robotic arm, a force on the end effector may cause a relative internal deflection between components of the FT sensor 300. The magnitude, direction, and/or location of the force may be measured by a sensor based on an amount of the deflection. In some examples, the FT sensor 300 may have a height of 25 mm and a 60 mm diameter when assembled as depicted in FIG. 3.

Moreover, the FT sensor 300 may include various mechanical and electrical connecting features (bolts, screws, fasteners, wiring, conduit, etc.) that are not expressly depicted or called out, but are known in the art. The components of the FT sensor 300 are centered around or coaxial with a neutral axis 302. Further, FIG. 3 includes a three-dimensional Cartesian coordinate system for reference. Although the neutral axis 302 is described and shown as to the z-axis, it should be understood that this relationship is for reference and example, and other possibilities are contemplated herein. Moreover, while forces, torques, and other relationships may be described herein in reference to the neutral axis 302 or the x-axis, y-axis, and z-axis as depicted in FIG. 3, other coordinate systems and axes may be defined and used without impacting the function of the FT sensor 300. For example, various components of another FT sensor may not all be coaxial or centered about a single neutral axis.

The rigid plate 350 may be considered a toolplate, a lid, or a top plate, among other aspects. The rigid plate 350 may be coupled to components of a robotic system, such as a robotic arm, end effector, gripper, housing, or other possible components. For example, a component of a robotic arm (e.g., robotic arm 200 of FIG. 2) may be coupled to the rigid plate 350 utilizing various aspects of the rigid plate 350. For example, the rigid plate 350 may include openings that are configured to accept a bolt, threaded screw, or other fastener, thereby mechanically coupling the rigid plate 350 (and FT sensor 300) to another component of the robotic system. A load applied to the component of the robotic system, for example, may be experienced by the rigid plate 350 via the connection between the rigid plate 350 and the other component(s) of the robotic system.

Moreover, the rigid plate 350 may include openings or other aspects for wiring or other electrical components. Such openings or aspects may provide connections to the sensing element 380, for example. The rigid plate 350 may be constructed from aluminum, other metals, injection molded, or 3D printed. Additionally, the rigid plate 350 may include one or more alignment features, such as slots, grooves, extrusions, etc. that may mechanically correspond to other features of the FT sensor 300 or the robotic system. The alignment features may also provide means for the rigid plate 350 to experience and/or transfer a load applied on the robotic system.

The sensing element 380 is coupled to the rigid plate 350. The sensing element 380 may fit within aspects or alignment features of the rigid plate 350. In some examples, a fastener may connect and hold the sensing element 380 in place relative to the rigid plate 350. The sensing element 380 is coupled to the rigid plate 350 such that the sensing element 380 moves with, or maintains the same relative positioning as, the rigid plate 350. As such, relative motion and displacements described herein with respect to the rigid plate 350 are also considered relative to the sensing element 380. Within examples, the sensing element 380 may include sensing means for determining a displacement and/or a force/torque. In other words, the sensing element 380 may include one or more components that define a sensor.

For example, the sensing element 380 may include an optical sensor that includes at least one emitter (such as a light emitting diode, or "LED") and at least one detector. The emitter may be configured to transmit light that is then reflected. The detector may be configured to receive the reflected light and make determinations about light data that describes characteristics (e.g., intensity) of the reflected light. Within examples, the sensing element 380 may include clusters or groupings of emitter(s) and detectors. For example, the sensing element 380 may include three clusters, each cluster with one emitter and four detectors. Other combinations and arrangements are contemplated.

Within examples, such as in FIG. 3 and FIG. 4, the sensing element 380 may be a printed circuit board ("PCB"). The PCB 380 may provide additional circuitry components and connections between the sensing means and other aspects of a robotic system, such as a control system for example. Similar to other features, using the PCB 380 may be simpler to manufacture and more easily reproducible than alternative development of sensing elements/techniques. Although an underside or bottom-side of the PCB 380 is hidden in the exploded view of FIG. 4, PCB 380 may include one or more LEDs and one or more detectors that are positioned opposite a plurality of reflective surface areas that are coupled to the flexure 310. The LEDs and detectors may be considered an optical sensor.

When a load is applied such that the PCB 380 with one or more sensors moves relative to the reflective surfaces, as described in more detail below, characteristics of light being emitted by the LEDs, reflected by the reflective surface areas, and collected by the sensor(s) on the PCB, will change. Based on the changes to the light reflected, the sensor or a control system connected thereto may be configured to determine at least one component of a load applied on the FT sensor 300. In some examples, the combination of the reflective surfaces, the LEDs, and the sensor(s) may comprise a sensor assembly.

FIG. 4 also depicts the gasket 390. The gasket 390 may encompass a cavity between the sensing element 380 and the reflective surface areas coupled to the flexure 310. As such, the gasket 390 may block out dust, ambient light, and other particles from interfering and/or coming between the sensing element 380 and the reflective surface areas. Within examples, the gasket 390 may be constructed from a soft material in order to not introduce parasitic loads which may otherwise affect the accuracy of FT sensor 300, among other reasons. The gasket 390 may be constructed from an elastic solid material, such as a formed silicone foam. In other examples, the gasket 390 may include a laminated stack of at least two layers of material. The gasket 390 may include alignment features such as slots, grooves, cut-outs, and other openings to fit around and couple to the sensing element 380 and/or the flexure 310. In some examples, the gasket 390 is inserted or squeezed between the sensing element 380 and/or the rigid plate 350 and the flexure 310. Among other aspects, the gasket 390 may seal the cavity in which an optical sensor operates free from external interferences.

FIG. 4 also depicts the reflector plate 332. The reflector plate 332 may include one or more reflective surfaces. The reflector plate 332 may be installed within the FT sensor 300 such that the one or more reflective surfaces are positioned opposite emitter(s) and/or detectors coupled to the sensing element 380. Within examples, the reflector plate 332 may be coupled to the flexure 310. In other examples, the reflector plate 332 may be a single component with the flexure 310, such as in a unibody flexure wherein the reflector plate is physically part of the flexure. The reflector plate 332 may take a variety of shape and sizes and may also add stiffness to aspects of the flexure 310. For example, as depicted in FIG. 4, the reflector plate 332 may take a triangular shape. Moreover, the reflector plate 332 may fit a cavity or cutout of the flexure 310 when coupled to the flexure 310.

As mentioned above, FIG. 3 and FIG. 4 also depict the second plate 395. In some aspects, the second plate 395 may be similar in form and function to the rigid plate 350. For example, a force or combination of forces may be applied to the second plate 395 which then is configured to transfer the force to the flexure 310 such that at least a portion of the flexure 310 moves relative to the rigid plate 350. As configured in FIG. 3 and FIG. 4, the second plate 395 may be coupled to the flexure 310. Within examples, the second plate 395 may be coupled to one or more legs or feet of the flexure 310. The second plate 395 may also couple with other components of a robotic system, such as joints, arms, end effectors, etc. Moreover, in some examples, the second plate 395 may be an adapter configured to couple to other components of a robotic system.

FIG. 3 and FIG. 4 further depict the flexure 310. The flexure 310 may be configured to mechanically act similar to a spring whereby the flexure 310 resists forces applied that may cause relative movement between components coupled to the flexure 310 (e.g., the rigid plate 350 and the second plate 395). In some examples, the flexure 310 may include components such that at least a portion of the flexure 310 moves with components coupled thereto, and thus the flexure 310 or components thereof may be considered to resist movement between the portion of the flexure 310 and the rigid plate 350 (or another attached component). The flexure 310 may maintain components attached thereto in a neutral position relative to one another until a force or torque is applied to cause the components to move relative to one another. Therefore, in some aspects, the flexure 310, including components thereof, may be considered to allow movement of the attached components relative to one another.

The flexure 310 shown in FIG. 3 and FIG. 4 is further described in the context of the perspective view of FIG. 5. As depicted in FIG. 5, the flexure 310 further includes an inner element 312, a plurality of openings 314, a plurality of connecting flexural elements 324, and a plurality of connecting elements 328. Within examples, the inner element 312, the plurality of connecting flexural elements 324, and the plurality of connecting elements 328 may be injection molded such that the elements together form a single, unibody, injection molded flexure 310. Among other possibilities, the inner element 312, the plurality of connecting flexural elements 324, and the plurality of connecting elements 328 may be molded plastic. By utilizing advancements in injection molding technologies, the flexure 310 may be a single unibody component that also can be produced quickly and more efficiently at a lower-cost than other flexure designs.

FIG. 5 also depicts a plurality of reflective surface areas 330 coupled to the inner element 312. Among other examples, the plurality of reflective surface areas 330 may be coupled to the reflector plate 332. The reflector plate 332 may also be coupled to the flexure 310. More particularly, the plurality of reflective surface areas 330 and/or the reflector plate 332 may be coupled to the inner element 312 of the flexure 310. The flexure 310 may be centered on the neutral axis 302. When in a neutral position, the inner element 312 of the flexure 310 may be centered and perpendicular to the neutral axis 302.

The inner element 312 may be considered an inner disk element as described in other sections herein. While the inner element 312 may be described and shown in some of the Figures as primarily circular or cylindrical, those are simply examples and other shapes are contemplated herein. For example, an inner element may be rectangular or hexagonal in some implementations. The inner element 312 is coupled to the plurality of connecting elements 328. The plurality of connecting elements 328 may be considered feet and/or legs of the flexure 310. Within examples, the plurality of connecting elements 328 may couple and/or provide means for connection to other features of a robotic system. As such, the inner element 312 and the plurality of connecting elements 328 are configured to move with the features of a robotic system that the plurality of connecting elements 328 are coupled thereto. For example, if a joint or an end effector is coupled to the plurality of connecting elements 328 (possibly via an adapter and/or another component such as the second plate 395, for example), when the joint or end effector twists about an axis, such as the neutral axis 302, the inner element 312 may experience a torque about the neutral axis 302 and also twist similarly.

The inner element 312 is also coupled to the plurality of connecting flexural elements 324. The plurality of connecting flexural elements 324 may also couple to the rigid plate 350, and/or other components of a robotic system, such as a housing, an adapter, a joint, or an end effector, for example. As depicted in FIG. 3 and FIG. 4, the plurality of connecting flexural elements 324 are coupled between the inner element 312 and the rigid plate 350. The plurality of connecting flexural elements 324 are configured to allow the inner element 312 to move relative to the rigid plate 350.

As depicted in FIG. 5, each of the plurality of connecting flexure elements 324 may include an arch shape, as such, each of the plurality of connecting flexure elements 324 may be considered an arch flexural element. While the plurality of connecting flexure elements 324 may include the arch shape, other shapes of flexural elements are contemplated herein. The shape, thickness, and overall geometrical design of each of the plurality of connecting flexure elements 324 may be based on a stiffness value or characteristic based on a designed loading and/or use of the FT sensor 300.

Based on the shape and dimensioning of the plurality of connecting flexural elements 324, the plurality of connecting flexural elements 324 may provide the FT sensor 300 with physical spring-like characteristics. For example, if the inner element 312 experiences an axial force along the z-axis (e.g. an applied axial loading), the inner element 312 may move a relative distance towards or away from the rigid plate 350 along the z-axis based (at least partly) on the bending and movement of each of the plurality of connecting flexure elements 324. Example relative movement is described in further detail in FIGS. 7-11 below.

Despite the relative movement, similar to a spring, the shape and design of the plurality of connecting flexure elements 324 as part of the flexure 310 may cause the inner element 312 to be biased towards a resting zero-load position relative to the rigid plate 350. The flexure 310 may be considered to be in the resting zero-load position in FIG. 5. Thus, if the aforementioned axial force along the z-axis is removed, the inner element 312 is configured to move back to the zero-load position relative to the rigid plate 350. Additionally, as the inner element 312 is moved further away from the zero-load position, a return force acting in a direction opposite that of the load applied on the inner element 312 may increase, thus increasing the bias towards the zero-load position. As such, within examples, the plurality of connecting flexural elements 324 may also resist the relative movement between the inner element 312 and the rigid plate 350.

The plurality of connecting flexural elements 324 may be designed to allow the inner element 312 and the rigid plate 350 to move in six degrees-of-freedom relative to one another. While the above example is given as an axial force acting parallel to the z-axis, other forces in various components of the six degrees-of-freedom are contemplated and the flexure 310 would operate similarly. Moreover, while the example axial force was applied to the inner element 312, the axial force may be applied to a component coupled to the inner element 312, the axial force may be applied to rigid plate 350, or the axial force may be applied to a component coupled to the rigid plate 350, among other possibilities. The concept described in the example above, and further examples below, remains the same for all relative movement between the inner element 312 and the rigid plate 350.

For example, a load may be applied to at least one of the inner element 312 or the rigid plate 350 and the load may cause at least one of the plurality of connecting flexural elements 324 to deflect. The load may include axial and/or radial components, exposing the flexure 310 to various forces and/or torques. Axial components of the load may cause tension or compression along an axis that may be parallel to the z-axis, as well as torques about the x-axis or the y-axis. Radial components of the load may cause forces along the x-axis or the y-axis, as well as torques about the z-axis. Furthermore, radial components of the load that are offset along the z-axis may cause torques about the x-axis and/or y-axis.

The plurality of connecting flexural elements 324 may be symmetrically spaced about the flexure 310. While FIG. 5 illustrates six connecting flexural elements 324, more or less than six flexural elements 324 are considered herein. In other examples, the connecting flexural elements 324 may not be symmetrically spaced about the flexure 310. For example, if a specific loading scenario with specific forces are designed to be applied on the flexure 310, additional connecting flexural elements 324 may be considered in asymmetrical locations to specifically account for the specific loading scenario. In other related examples, instead of additional connecting flexural elements 324, some connecting flexural elements 324 may have a certain stiffnesses designed for loads with specific force components while other connecting flexural elements 324 may have different stiffness characteristics.

Although not depicted in the Figures, the flexure 310 may include other configurations and features such as an outer ring portion that is coupled to the plurality of connecting flexural elements. The outer ring portion may couple to the sensing element 380 and be configured to move with the sensing element 380 and the rigid plate 350 in some instances among other examples.

As shown in the Figures and described in the example embodiments herein, a surface of the inner element 312 may be perpendicular to the neutral axis 302. In other words, the surface of the inner element 312 may be parallel to a plane defined by the x-axis and the y-axis. The surface of the inner element 312 may also include the reflector plate 332 and the reflective surface areas 330. The surface of the inner element 312 may be considered a top surface of the inner element 312. Additionally, the surface of the inner element 312 may be prominently flat but for the reflective surface areas 330 when the reflector plate 332 is coupled to the inner element 312.

As depicted in FIG. 5, the plurality of openings 314 may be included in the inner element 312. As such, each of the plurality of openings 314 may extend through the inner element 312. In some embodiments, such as shown in FIG. 5, the inner element 312 may include three openings 314 and each of the openings 314 may be cylindrical cavities within the inner element 312. More or less openings 314 with other shapes are also considered.

Within examples, the inner element 312 may include a plurality of extended portions 316 that extend in a direction parallel to the z-axis away from the surface of the inner element 312. Each of the extended portions 316 may surround and/or extend one of the openings 314 as shown in FIG. 5, for example. Moreover, each extended portion 316 may include a lateral surface 318 that is perpendicular to the z-axis and parallel to the surface of the inner element 312. Each of the plurality of openings 314 includes an internal surface 320. In some aspects, each extended portion 316 may also include at least a portion of the internal surface 320 of the respective opening 314.

The plurality of hardstops 360 shown in FIG. 4 are further described in the perspective view of FIG. 6. Each of the plurality of hardstops 360 extend through one of the plurality of openings 314 of the inner element 312 of the flexure 310. The openings 314 are located about a periphery or edge of the inner element 312 such that the hardstops 360 are also located away from the neutral axis 302 through the center of the FT sensor 300. By locating the hardstops 360 around the periphery, or away from the center neutral axis 302, the hardstops 360 may better protect the flexure 310 when torques are applied to the FT sensor 300. Moreover, each of the plurality of hardstops 360 is coupled to the rigid plate 350. Each of the hardstops 360 may be configured to contact the inner element 312 of the flexure 310 when a load applied on the FT sensor 300 exceeds a threshold load.

Within examples, such as depicted in FIG. 3, the plurality of hardstops 360 may include three hardstops 360. In other words, two additional hardstops 360 in addition to the hardstop 360 of FIG. 6 may extend through openings 314 of the inner element 312 and also couple to the rigid plate 350. In other examples, a single hardstop 360 or two hardstops 360 may be utilized. In yet other examples, more than three hardstops 360 may be used. Moreover, the plurality of hardstops 360 may be symmetrically spaced about the inner element 312 and/or the rigid plate 350. In some aspects, the hardstops 360 may be positioned around an outer edge or periphery of the rigid plate 350 and/or the inner element 312. Such a location for the hardstops 360 may allow the hardstops 360 to better provide overload protection in six degrees-of-freedom as described herein.

Each hardstop 360 may include a head portion 362, a body portion 370, and a connecting portion 374. Within examples, the hardstop 360 may be a shoulder bolt or a similar hardware component. The hardstop 360 may be constructed from a rigid material, such as the same material as the rigid plate 305, among other examples. The connecting portion 374 may be at a distal end of the hardstop 360 and also be the portion of the hardstop 360 that couples to the rigid plate 350. The connecting portion 374 may be a threaded portion in some examples that screws into receiving threads of the rigid plate 350. The hardstop 360 may be rigidly coupled to the rigid plate 350 such that the rigid plate 350 and the hardstop 360 move together, i.e., there is no relative movement between the rigid plate 350 and the hardstop 360.

The body portion 370 may extend from the connecting portion 374 to the head portion 362. The body portion 370 of the hardstop 360 may be cylindrical in shape and extend in a direction parallel to the z-axis of the FT sensor 300 and/or the rigid plate 350 in a zero-load position. A diameter of the body portion 370 may be greater than a diameter of the connecting portion 374, but less than a diameter of the head portion 362. The body portion 370 includes a body surface 372 that may be a cylindrical surface. At least a portion of the body surface 372 may be configured to contact at least a portion of the internal surface 320 of the openings 314 of the inner element 312 of the flexure 310.

The head portion 362 may be at a proximal end of each hardstop 360. The head portion 362 includes a lateral surface 364 that surrounds and transitions from the body portion 370 to the head portion 362. Within examples the lateral surface 364 may be perpendicular to the z-axis when the FT sensor 300 is in a zero-load position. The head portion 362 further includes a vertical surface 366. The vertical surface 366 may be similar to the body surface 372, but with a larger diameter. The vertical surface 366 of the head portion 362 may also be configured to contact at least a portion of the internal surface 320 of the openings 314 of the inner element 312 of the flexure 310. The head portion 362 further includes a proximal end surface 368.

V. Example Loading Scenarios of an Example Force/Torque Sensor

FIGS. 7-11 describe various example loading scenarios of the FT sensor 300. The FT sensor 300 is similar in form and function to the FT sensor 300 described in FIGS. 3-6 above. However, it should be understood that the FT sensor 300 may include components and aspects not previously described or expressly depicted and that any description of the FT sensor 300 in this section does not limit that of the FT sensor 300 previously described.

Moreover, some components or aspects of the FT sensor 300 are not expressly labeled in FIGS. 7-11 but were previously identified and described in other Figures described above, including how those components or aspects are utilized or are integrated into the FT sensor 300. For example, not all of the various surfaces and components described in FIG. 5 and FIG. 6 as those surfaces and components relate to the flexure 310 and the hardstops 360, respectively, have been re-labeled in FIGS. 7-11. Nonetheless, it should be recognized that those surfaces exist within FIGS. 7-11 as described in other Figures.

Figure 7:
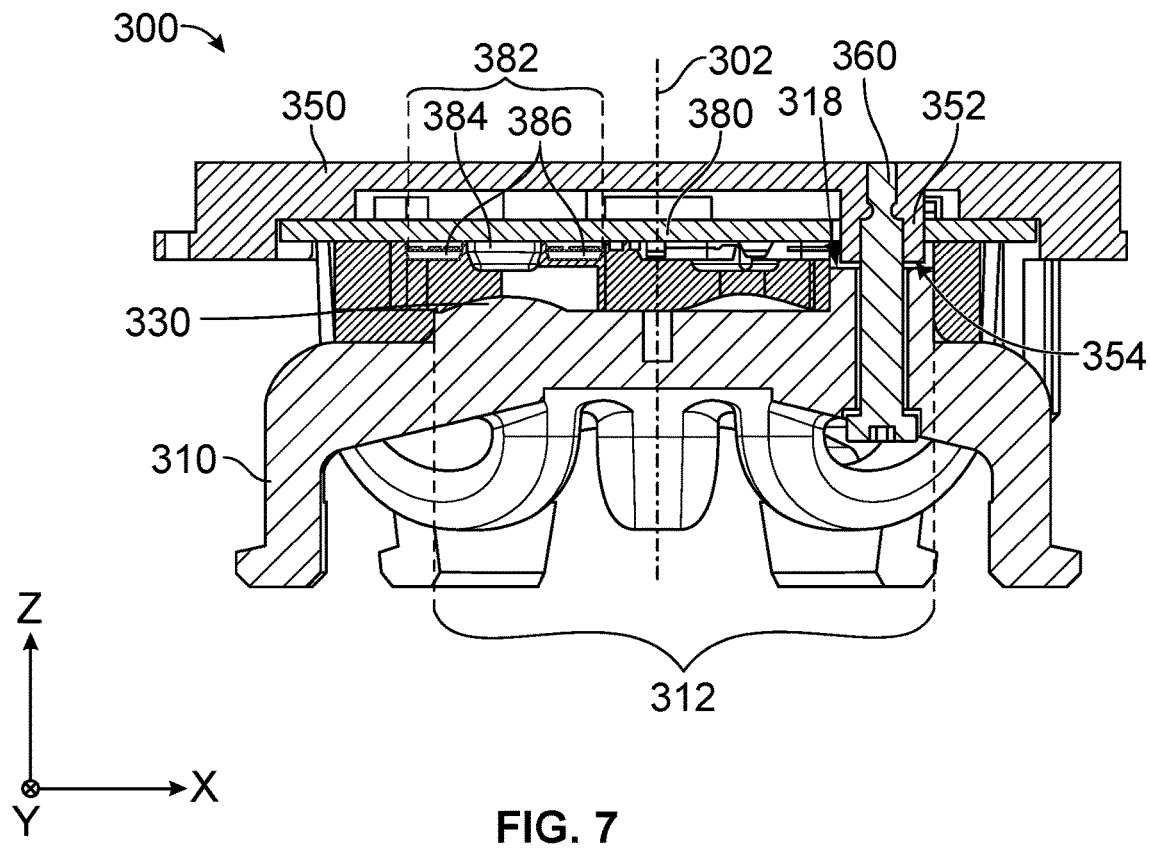
FIG. 7 illustrates a section-view of force/torque sensing device in a neutral position, according to an example embodiment.

FIG. 7 illustrates FT sensor 300 in a neutral position or a zero-load position where no external loads are being applied to components of the FT sensor 300. As depicted in FIG. 7, the FT sensor 300 includes the flexure 310, the rigid plate 350, and the hardstop 360. The rigid plate 350 includes an extended portion 352 and the extended portion 352 includes a lateral surface 354. The extended portion 352 of the rigid plate 350 includes an opening to receive the hardstop 360. Thus, the hardstop 360 is coupled to the rigid plate 350. The lateral surface 354 of the extended portion 352 may be positioned opposite the lateral surface 318 of the extended portion 316 of one of the openings 314 of the inner element 312 of the flexure 310. Moreover, within examples, the extended portion 352 of the rigid plate 350 extends through openings of the sensing element 380.

The sensing element 380 is coupled to the rigid plate 350. As depicted in the side view of FIG. 7, a plurality of sensing clusters 382 that each include an emitter 384 and a plurality of detectors 386 are coupled to the sensing element 380. Each sensing cluster 382 is positioned opposite of one of the plurality of reflective surface areas 330. While in the zero-load position, each of the rigid plate 350 and the flexure 310 are coaxial and aligned with the neutral axis 302.

Moreover, when the FT sensor is in the zero-load position, a clearance distance or a space may exist between the internal surface 320 of one of the openings 314 of the inner element 312 and the surfaces of the hardstop 360 (e.g., a portion of the body surface 372, the lateral surface 364, and the vertical surface 366). Further, there may be a gap, space, or a clearance distance between lateral surface 354 of the extended portion 352 of the rigid plate 350 and the lateral surface 318 of the extended portion 316 of one of the openings 314 of the inner element 312 of the flexure 310. The clearance distance may be about 0.3 mm within some embodiments.

During regular operation, when the FT sensor 300 is exposed to loads less than a threshold load, the gaps between the components described may change as the rigid plate 350 (and components rigidly attached thereto) and the inner element 312 of the flexure 310 move relative to one another. However, within examples, so long as the loading experienced by the FT sensor 300 is less than the threshold load, the inner element 312 should not come into contact with neither the hardstop 360 nor the rigid plate 350. During such loading, the plurality of connecting flexural elements deform or deflect and allow relative movement of the inner element 312 and the rigid plate 350 (among other connected components).

However, if a load applied on the FT sensor 300 exceeds the threshold load, in order to prevent the plurality of flexural elements from deforming to a point that may cause permanent deformation or otherwise limit the ability of the FT sensor 300 to perform as designed, the inner element 312 will contact at least one of at least a portion of the hardstop 360 or the extended portion 352 of the rigid plate 350. Various example overload conditions (i.e., where the load applied exceeds the threshold load) are provided as examples in FIGS. 8-11.

Figure 8:
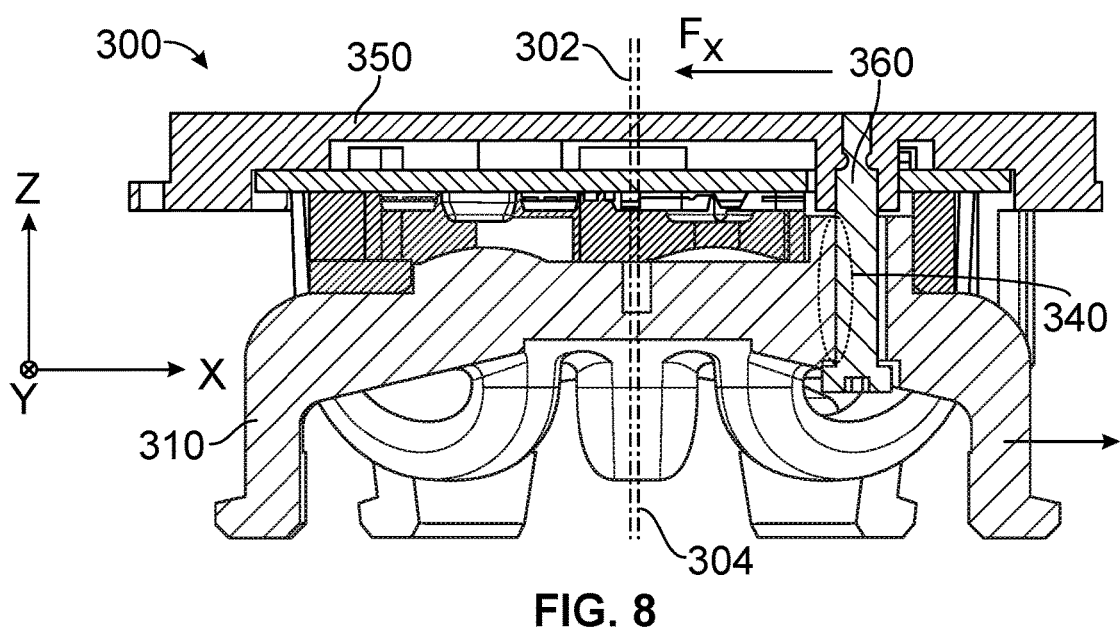
FIG. 8 illustrates a section-view of force/torque sensing device with a force acting on the sensing device, according to an example embodiment.

Continuing to FIG. 8, FIG. 8 depicts the FT sensor 300 when a load or component thereof acting along the x-axis exceeds a threshold load. Among other possibilities, in FIG. 8, the load $F_x$ is applied to the rigid plate 350 as depicted. From the perspective shown in FIG. 8, the flexure 310 including the inner element 312 has shifted in a direction along the x-axis opposite the force. As such, while the axis 302 remains centered on the rigid plate 350, a shifted axis 304 that is centered on the inner element 312 of the flexure 310 shows the relative displacement or movement between the components.

To prevent further relative motion between the inner element 312 and the rigid plate 350 when the load applied exceeds the threshold load, the inner element 312 contacts the hardstop 360. Among other possibilities, the inner element 312 contacts the hardstop 360 at contact point 340; there is no longer a gap at contact point 340 as there was previously (as shown in FIG. 7). More particularly, the internal surface 320 of one of the openings 314 of the inner element 312 contacts at least a portion of the body surface 372 of the hardstop 360. In some examples, the vertical surface 366 of the head portion 362 of the hardstop 360 may also contact a portion of the internal surface 320 of the opening 314 of the inner element 312.

While FIG. 8 only depicts the single axial loading acting along the x-axis exceeding the threshold load, FIG. 8 should be considered exemplary for other loads acting within the x-y plane. In other words, FIG. 8 provides an example of the overload protection provided by the hardstop 360 in at least a first and a second degree of freedom.

Figure 9:
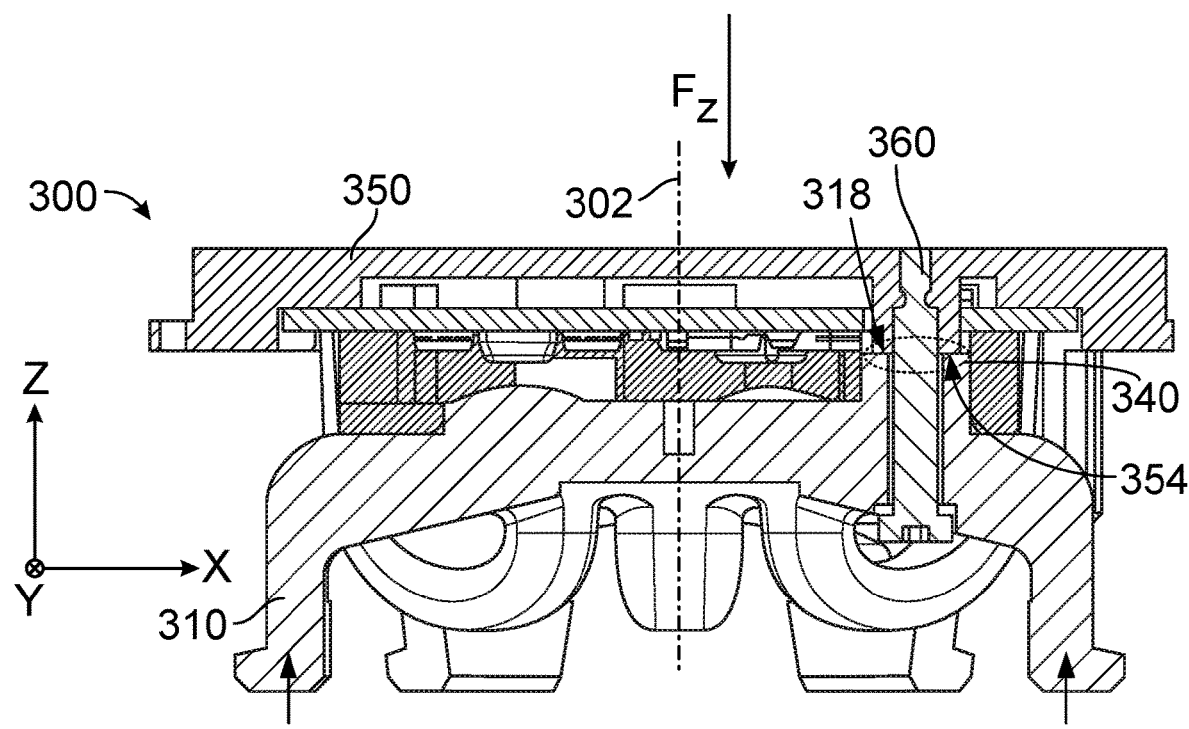
FIG. 9 illustrates a section-view of force/torque sensing device with a force acting on the sensing device, according to an example embodiment.

Continuing to FIG. 9, FIG. 9 depicts the FT sensor 300 when a compressive load or component thereof acting along the z-axis exceeds a threshold load. Among other possibilities, in FIG. 9, the load $F_z$ is applied to the rigid plate 350 as depicted. From the perspective shown in FIG. 9, the flexure 310 including the inner element 312 has shifted in a direction along the z-axis opposite the force. Within examples, $F_z$ may be considered a compressive load, or a compressive component of the applied load as it causes the components to compress closer together.

To prevent further relative motion between the inner element 312 and the rigid plate 350 when the compressive load exceeds the threshold load in a direction parallel to the z-axis (e.g., the vertical axis) is applied, the inner element 312 contacts the rigid plate 350. Among other possibilities, the inner element 312 contacts the rigid plate 350 at contact point 340. More particularly, at least a portion of the lateral surface 318 of the extended portion 316 surrounding one of the openings 314 of the inner element 312 contacts at least a portion of the lateral surface 354 of the extended portion 352 of the rigid plate 350.

While a compressive force acting parallel to the z-axis is depicted in FIG. 9, a force acting in tension (i.e., also parallel to the z-axis) could similarly be applied to the FT sensor 300. In such a loading scenario, it should be understood that the point of contact, rather than being between the inner element 312 and the rigid plate 350, would be instead at the head portion 362 of the hardstop 360. Particularly, the lateral surface 364 of the head portion 362 of the hardstop 360 may contact a lateral portion 321 of the internal surface 320 of one of the openings 314 of the inner element 312. The lateral portion 321 of the internal surface 320 may be positioned opposite the lateral surface 364, among other possibilities.

So while FIG. 9 only depicts the compressive loading acting along the z-axis exceeding the threshold load, FIG. 9 should be considered exemplary for other loads acting along the z-axis. In other words. FIG. 9 provides an example of the overload protection provided by either the hardstop 360 or the rigid plate 350 in a third degree of freedom (in addition to the first two degrees of freedom described as they relate to FIG. 8).

Figure 10:
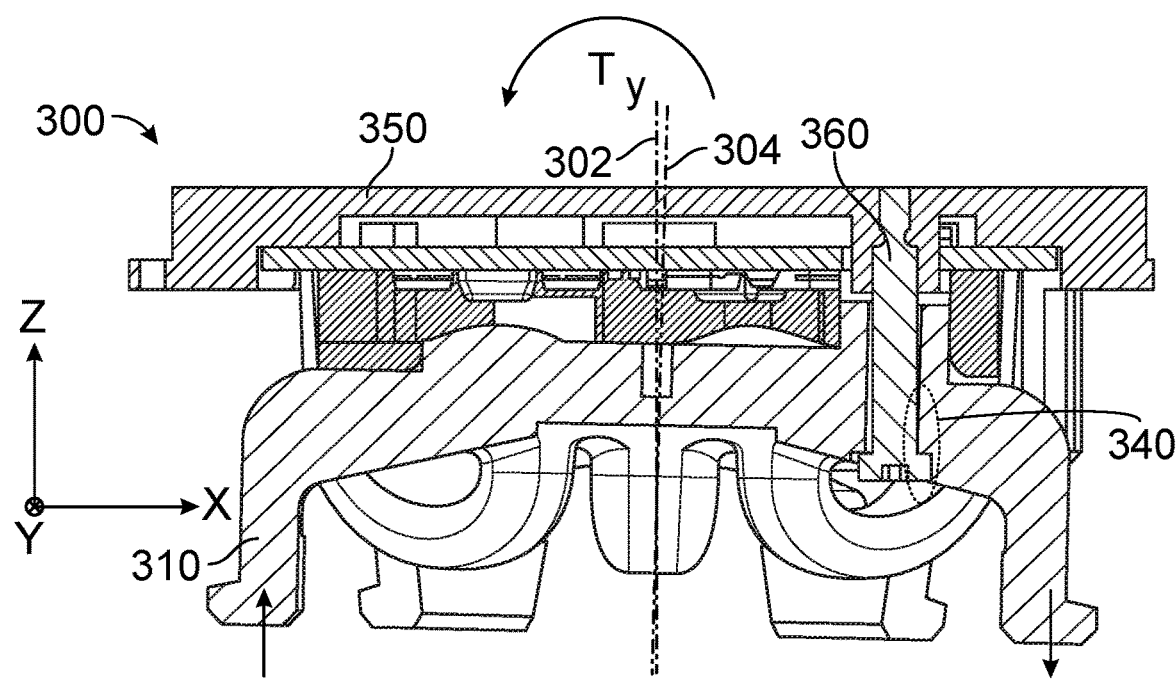
FIG. 10 illustrates a section-view of force/torque sensing device with a torque acting on the sensing device, according to an example embodiment.

Continuing to FIG. 10, FIG. 10 depicts the FT sensor 300 when a load or component thereof, which creates a torque about the y-axis, exceeds a threshold load. Among other possibilities, in FIG. 10, the load $T_y$ is applied to the rigid plate 350 as depicted. From the perspective shown in FIG. 10, the flexure 310 including the inner element 312 has shifted or tilted about the y-axis opposite the applied torque. As such, while the axis 302 remains centered on the rigid plate 350, a tilted axis 304 that is centered on the inner element 312 of the flexure 310 showing the relative displacement or movement between the components.

To prevent further relative motion between the inner element 312 and the rigid plate 350 when the load applied exceeds the threshold load, the inner element 312 contacts the hardstop 360. Among other possibilities, the inner element 312 contacts the hardstop 360 at contact point 340; i.e., there is no longer a gap at contact point 340 as there was previously (as shown in FIG. 7). More specifically, the internal surface 320 of one of the openings 314 of the inner element 312 may contact at least one of the lateral surface 364 of the hardstop 360, the vertical surface 366 of the head portion 362 of the hardstop 360, and/or the body surface 372 of the hardstop 360. In some examples, the lateral portion 321 of the internal surface 320 may contact the lateral surface 364 of the head portion 362 of the hardstop 360.

While FIG. 10 only depicts the single torque acting about the y-axis, FIG. 10 should be considered exemplary for other torques acting about the x-axis and y-axis. In other words, FIG. 10 provides an example of the overload protection provided by the hardstop 360 in at least a fourth and fifth degree of freedom.

Figure 11:
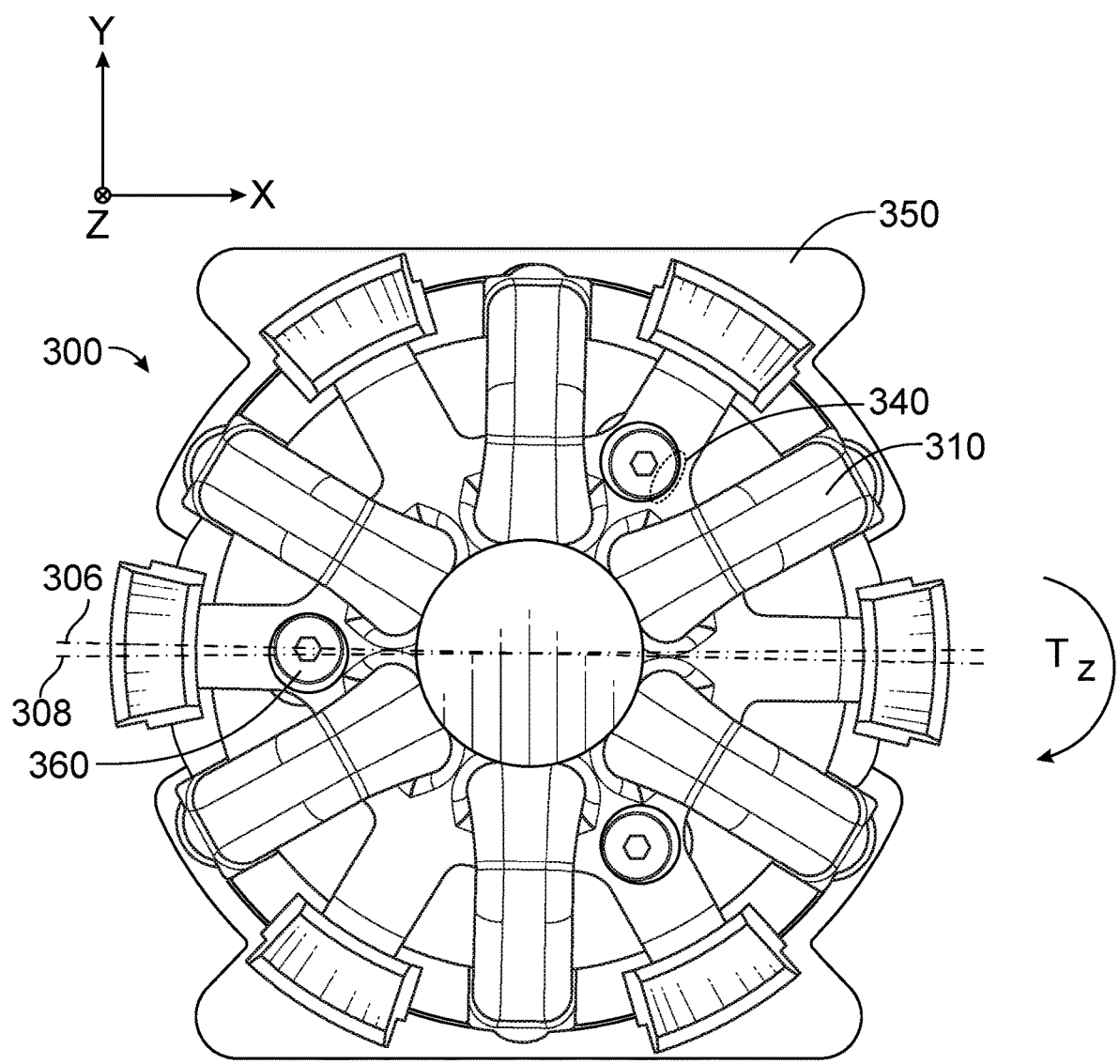
FIG. 11 illustrates a section-view of force/torque sensing device with a torque acting on the sensing device, according to an example embodiment.

Continuing to FIG. 11, FIG. 11 depicts the FT sensor 300 when a load or component thereof, which creates a torque about the z-axis, exceeds a threshold load. Among other possibilities, in FIG. 11, the load $T_z$ is applied to the rigid plate 350 as depicted. From the perspective shown in FIG. 11, the flexure 310 including the inner element 312 has shifted or turned about the z-axis opposite the applied torque. As such, a second neutral axis 306 parallel to the x-axis that is centered on the rigid plate 350 is shown offset from the turned axis 308 that is centered on the inner element 312 of the flexure 310 showing the relative displacement or movement between the components.

To prevent further relative motion between the inner element 312 and the rigid plate 350 when the torque applied exceeds a threshold torque about the z-axis, the inner element 312 contacts the hardstop 360. Among other possibilities, the inner element 312 contacts the hardstop 360 at contact point 340; i.e., there is no longer a gap at contact point 340 as there was previously (as shown in FIG. 7). More specifically, the internal surface 320 of one of the openings 314 of the inner element 312 may contact at least one of the vertical surface 366 of the head portion 362 of the hardstop 360 and/or the body surface 372 of the hardstop 360.

While FIG. 11 only depicts the single torque acting about the z-axis, FIG. 11 should be considered exemplary for other torques acting about the z-axis. In other words, FIG. 11 provides an example of the overload protection provided by the hardstop 360 in at least a sixth degree of freedom.

FIG. 12 is a flowchart of an example method for providing overload protection and preventing further deformation and possible damage to the flexure of a FT sensor. In one example implementation, method 1200 describes a FT sensor receiving a load and then limiting further deformation of components of a flexure of the FT sensor, among other possibilities.

Illustrative methods, such as method 1200, may be carried out in whole or in part by a component(s) in a robotic system, such as one or more of the components in the robotic system 100 illustrated in FIG. 1, or by a component(s) in robotic arm 200 as illustrated in FIG. 2. It should be understood that example methods, such as method 1200, might be carried out by entities, or combinations of entities (i.e., by other computing devices, robotic devices, and/or combinations thereof), without departing from the scope of the invention.

For example, functions of the method 1200 may be fully performed by a computing device (or components of a computing device such as one or more processors or controllers), or may be distributed across multiple components of the computing device, across multiple computing devices, a control system and/or across a server. In some examples, the computing device may receive information from sensors of the computing device, or may receive information from other computing devices that collect the information. As with other examples, a computing device, a server, or a robotic system may perform the method 1200.

As shown by block 1202, the method 1200 includes receiving a load on a rigid plate. The rigid plate is coupled to a flexure, and the flexure may be a component of a FT sensor. The FT sensor may be similar to and include similar components to the FT sensor 300 described in FIGS. 3-11.

As shown by block 1204, when the load is received, the method further includes deforming at least one of a plurality of connecting flexural elements of the flexure. The connecting flexural elements are configured to allow relative movement between components of the flexure and the rigid plate. The connecting flexural elements deform or deflect in order to allow the relative movement described.

As shown by block 1206, the method further includes a portion of the flexure, such as a surface of the flexure, contacting a hardstop when the load that was received exceeds a threshold load. Moreover, the hardstop extends through the flexure and is also coupled to the rigid plate. Among other aspects, contacting the hardstop may include an internal surface of an opening of the flexure contacting (i) a body portion of the hardstop, (ii) a cylindrical head portion of the hardstop (e.g., the vertical surface 366 of the head portion 362), or (iii) a lateral surface of the hardstop. The lateral surface may be perpendicular to the cylindrical body portion of the hardstop. Further, the hardstop may extend through an opening of the flexure.

As shown by block 1208, the method further includes the hardstop limiting further deformation of the at least one of the plurality of connecting flexural elements when the portion of flexure contacts the hardstop. In some examples, the hardstop may be considered to prevent further deformation of the at least one of the plurality of connecting flexural elements.

The method 1200 may also include a lateral surface of the flexure contacting a corresponding lateral surface of the rigid plate. Within examples, the lateral surface of the flexure and the lateral surface of the rigid plate may be spaced a clearance distance from one another when the FT sensor is in a zero-load position. The lateral surfaces may be perpendicular to a cylindrical body portion of the hardstop when the FT sensor is in the zero-load position.

Among other examples, the hardstop may also extend through a PCB that is coupled to the rigid plate. In such examples, the method 1200 may further includes a sensor coupled to the PCB emitting light towards a plurality of reflective surface areas that are coupled to the flexure. Further, the method 1200 may include detecting the light reflected by the sensor.

In further examples, the method 1200 may include determining one or more output parameters based on one or more deflections of an inner element of the flexure relative to the rigid plate when a load is applied to at least one of the components. One or more output parameters based on one or more deflections may include at least one force component of an applied load. Additionally, the one or more output parameters may include a position or orientation of an end effector or appendage of a robotic system.

Within examples, at least one sensor may measure one or more deflections of the inner element relative to the rigid plate when a load is applied. The at least one sensor may then determine at least one force component of the applied load based on the measured deflections. Within other examples, the at least one sensor may determine at least one force component of the applied load based on raw signals transmitted from sensing elements of the at least one sensor. The raw signals transmitted from sensing elements of the at least one sensor may be dependent on the deflection(s) between the inner element relative to the rigid plate.

Determining one or more output parameters may include transmitting raw output signals, such as voltage or frequency, from sensing elements of the at least one output sensor to a computing device and/or control system. The computing device may be within the at least one sensor, or may be somewhere else within a robotic system, such as the robotic system 100 in FIG. 1. The computing device may then determine at least one force component of the applied load, or may determine the orientation of the end effector of a robotic arm, such as end effector 208 of FIG. 2, based on the raw signals from the sensing elements. Further, the deflections caused by the load applied to the flexure assembly may further include the displacement and/or rotation of the inner element relative to the rigid plate.

The method 1200 may further include determining at least one component of the forces and torques of the applied load based on the one or more deflections measured. In one example, the determining of at least one component of the forces and torques may be further based on the stiffness of the connecting flexural elements. In one aspect, the forces and torques may include at least axial and/or radial forces and torques. In one embodiment, the method 1200 may further include altering the operation of at least one of an end effector or a robot arm, based on at least one component of the determined the forces and torques.

Altering the operation of at least one of the end effector or the robot arm may include adjusting an orientation of at least one of the end effector or the robot arm. In other examples, altering the operation of at least one of the end effector or the robot arm may include shutting the robot system off, holding the robot in a static position, or putting the robotic system into a safety mode when a high force is detected. In yet other examples, electric current applied to actuators or motors of the robotic system (such as actuator(s) 114 of FIG. 1) may be adjusted to reduce the forces applied to the flexure assembly. The end effector may be similar to end effector 208 of FIG. 2, and may be coupled to the FT sensor among other possibilities.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information, such as a block of a method described above, may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

VI. Conclusion

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

I claim:

1. A device, comprising:
  a rigid plate comprising an extended portion extending from an inner surface of the rigid plate;
  a flexure coupled to the rigid plate, wherein the flexure comprises:
    an inner element coupled to a plurality of reflective surface areas, wherein the plurality of reflective surface areas are configured to reflect light to a sensor, wherein the inner element comprises an extended portion extending from an inner surface of the inner element and surrounding an opening of the inner element; wherein the inner surface of the rigid plate faces the inner surface of the inner element; and
    a plurality of connecting flexural elements coupled between the inner element and the rigid plate, wherein the plurality of connecting flexural elements are configured to allow the inner element to move relative to the rigid plate; and
  a hardstop that extends through the opening of the inner element of the flexure and is coupled to the extended portion of the rigid plate, wherein the inner element contacts the hardstop when a tensile component of an applied load exceeds a tensile threshold load, and wherein the extended portion of the inner element contacts the extended portion of the rigid plate when a compressive component of the applied load exceeds a compressive threshold load.

2. The device of claim 1, further comprising an additional hardstop, wherein the additional hardstop extends through an additional opening of the inner element, wherein the additional hardstop is coupled to the rigid plate, and wherein each of the hardstops are symmetrically spaced out about a periphery of the inner element.

3. The device of claim 1, wherein the hardstop comprises:
a cylindrical body portion that extends in a direction parallel to an axis of the rigid plate; and
a head portion comprising a lateral surface perpendicular and adjacent to the body portion and a vertical surface concentric with the body portion and extending in the direction parallel to the axis.

4. The device of claim 3, wherein at least a portion of an internal surface of the opening of the inner element contacts at least one of the body portion or the vertical surface of the head portion of the hardstop when a lateral component of the load applied that is perpendicular to the axis exceeds a threshold lateral load.

5. The device of claim 3, wherein at least a portion of an internal surface of the opening of the inner element contacts at least one of the body portion or the vertical surface of the head portion of the hardstop when a torque applied about the axis exceeds a threshold torque about the axis.

6. The device of claim 3, wherein at least a portion of an internal surface of the opening of the inner element contacts at least one of the body portion, the lateral surface of the head portion, or the vertical surface of the head portion of the hardstop when a torque applied about a lateral axis perpendicular to the axis of the inner element exceeds a threshold torque about the lateral axis.

7. The device of claim 3, wherein the extended portion of the rigid plate comprises a lateral surface perpendicular to the axis of the rigid plate, and wherein the inner element contacts either the lateral surface of the extended portion of the rigid plate or the lateral surface of the head portion of the hardstop when a vertical load applied in a direction parallel to the axis exceeds a threshold vertical load.

8. The device of claim 3, wherein the body portion and the head portion of the hardstop are each at least partially encompassed by the inner element.

9. The device of claim 1, further comprising:
a second rigid plate coaxial with the inner element; and
wherein the flexure further comprises a plurality of connecting elements coupled between the second rigid plate and the inner element, wherein the plurality of connecting elements are configured such that the second rigid plate and the inner element move together when a load is applied.

10. The device of claim 1, further comprising a printed circuit board (PCB) coupled to the rigid plate, wherein the hardstop also extends through an opening of the PCB, and wherein the PCB comprises the sensor.

11. The device of claim 10, wherein the extended portion of the rigid plate also extends through the opening of the PCB.

12. The device of claim 1, wherein the hardstop is a clearance distance from the opening of the inner element when no load is applied to the device.

13. The device of claim 1, wherein each of the plurality of connecting flexural elements is configured to deform in at least one of six degrees-of-freedom when a load is applied to the device.

14. A method, comprising:
receiving a load on a rigid plate coupled to a flexure, wherein the rigid plate comprises an extended portion extending towards the flexure, and wherein the flexure comprises an extended portion that extends towards the rigid plate and surrounds an opening of the flexure;
deforming at least one of a plurality of connecting flexural elements of the flexure when the load is received, wherein the plurality of connecting flexural elements is coupled to the rigid plate;
contacting, by a portion of the flexure, a hardstop when the load received exceeds a threshold load, wherein the hardstop extends through the opening of the flexure and is coupled to the extended portion of the rigid plate;
preventing, by the hardstop, further deformation of the at least one of the plurality of connecting flexural elements when the portion of the flexure contacts the hardstop;
contacting, by the extended portion of the flexure, the extended portion of the rigid plate when a compressive component of the load exceeds a compressive threshold load; and
preventing further deformation of the at least one of the plurality of connecting flexural elements when the extended portion of the flexure contacts the extended portion of the rigid plate.

15. The method of claim 14, wherein contacting the hardstop comprises:
contacting, by an internal surface of an opening of the flexure, at least one of a cylindrical body portion of the hardstop, a cylindrical head portion of the hardstop, or a lateral surface of the hardstop, wherein the lateral surface is perpendicular to the cylindrical body portion, and further wherein the hardstop extends through the opening of the flexure.

16. The method of claim 14, further comprising:
contacting, by a lateral surface of the flexure, a corresponding lateral surface of the rigid plate, wherein the lateral surface of the flexure is perpendicular to a cylindrical body portion of the hardstop.

17. The method of claim 14, wherein the hardstop further extends through a printed circuit board (PCB) coupled to the rigid plate, the method further comprising:
emitting light, by a sensor coupled to the PCB, towards a plurality of reflective surface areas coupled to the flexure; and
detecting, by the sensor, the light reflected.

18. The method of claim 14, further comprising:
contacting, by a second portion of the flexure, a head portion of the hardstop when a tensile component of the load exceeds a tensile threshold load;
preventing further deformation of the at least one of the plurality of connecting flexural elements when the second portion of the flexure contacts the head portion of the hardstop.

19. A robotic system comprising:
a rigid plate comprising an extended portion;
a flexure, comprising:
an inner element coupled to a plurality of reflective surface areas, wherein the plurality of reflective surface areas are configured to reflect light to a sensor;
a plurality of connecting flexural elements coupled between the inner element and the rigid plate, wherein the plurality of connecting flexural elements are configured to allow the inner element to move relative to the rigid plate;
a printed circuit board (PCB) coupled to the rigid plate, wherein the extended portion of the rigid plate extends through the PCB and towards the inner element of the flexure, and wherein the PCB comprises the sensor;

a control system configured to:
- receive reflected light data from the sensor;
- based on the reflected light data, determine a deflection of the inner element relative to the rigid plate when a load is applied on at least one of the inner element or the rigid plate of the robotic system;
- based on the deflection determined, determine one or more output parameters of the applied load on the robotic system; and a hardstop that extends through an opening of the inner element of the flexure, extends through the PCB, and is coupled to the extended portion of the rigid plate, wherein the hardstop contacts the inner element when a load applied on the robotic system exceeds a threshold load.

20. The system of claim 19, wherein, when a compressive component of the load applied exceeds a threshold compressive load, the extended portion of the rigid plate contacts the inner element.

* * * * *